United States Patent [19]
Amano et al.

[11] Patent Number: 5,741,528
[45] Date of Patent: Apr. 21, 1998

[54] TIRE VULCANIZING SYSTEM

[75] Inventors: Itaru Amano; Kashiro Ureshino; Katsumi Ichikawa, all of Takasago; Takumi Mizokawa, Toyohashi; Ko Takakura, Takasago; Masaki Naoi, Takasago; Yasuo Morita, Takasago, all of Japan

[73] Assignee: Kabushiki Kaisha Kobe Seiko Sho, Kobe, Japan

[21] Appl. No.: 515,060

[22] Filed: Aug. 14, 1995

[30] Foreign Application Priority Data

Aug. 25, 1994 [JP] Japan .................. 6-225582

[51] Int. Cl.$^6$ ........................... B29C 35/02
[52] U.S. Cl. .................. 425/29; 425/34.1; 425/38
[58] Field of Search ............... 425/29, 34.1, 38, 425/58.1

[56] References Cited

U.S. PATENT DOCUMENTS

| | | | |
|---|---|---|---|
| 4,585,405 | 4/1986 | Capecchi | 425/38 |
| 4,629,385 | 12/1986 | Irie | 425/38 |
| 4,728,274 | 3/1988 | Siegenthaler | 425/38 |
| 4,881,882 | 11/1989 | Fantacci | 425/38 |
| 5,314,648 | 5/1994 | Ichikawa et al. | 425/38 |

FOREIGN PATENT DOCUMENTS

| | | |
|---|---|---|
| 46-17578 | 5/1971 | Japan . |
| 46-24774 | 7/1971 | Japan . |
| 46-32497 | 9/1971 | Japan . |
| 49-130471 | 12/1974 | Japan . |
| 52-44795 | 11/1977 | Japan . |
| 58-44473 | 10/1983 | Japan . |
| 62-290507 | 12/1987 | Japan . |
| 4-323010 | 11/1992 | Japan . |

Primary Examiner—James P. Mackey
Attorney, Agent, or Firm—Oblon, Spivak, McClelland, Maier & Neustadt, P.C.

[57] ABSTRACT

A tire vulcanizing system capable of performing high accuracy transportation of a green tire by a loader and of performing high accuracy transportation of a vulcanized tire by an unloader including a group of tire vulcanizing presses having many tire vulcanizing presses 1 arranged in a row and manipulators 2 arranged along the group of the tire vulcanizing presses in such a way that they may freely run. The tire vulcanizing presses 1 are constructed such that the upper and lower molds 80, 81 are stored between the engaging or disengaging upper and lower press members in such a manner that they may be fastened with the green tire mounting table 7 and the post-cure inflator 8 arranged around them. The manipulators 2 are provided with slides 31 which can be connected to the upper press member in such a way that they may be lifted up or descend, loader 32 for transporting the green tire from the center of the green tire mounting table 7 to the centers of the molds 80, 81, and unloader 33 for transporting the vulcanized tire from the centers of the molds 80, 81 to the center of the post-cure inflator 8 or its near center. The manipulators 2 are provided with the position setting element 34 for stopping in respect to the desired tire vulcanizing press 1. At least one of the loader 32 and the unloader 33 is provided with a centering corrector for accommodating for an error in stopping position by the position setting element 34.

3 Claims, 31 Drawing Sheets

SIDE ELEVATIONAL VIEW

FRONT ELEVATIONAL VIEW

SIDE ELEVATIONAL VIEW

FIG. 5 TOP PLAN VIEW

SECTION A-A

FIG. 11
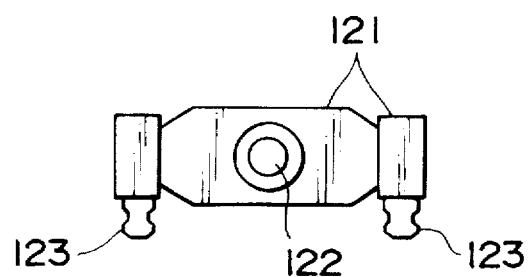
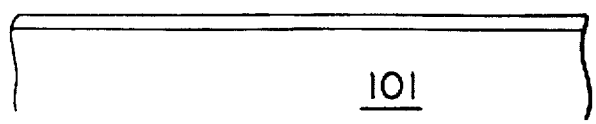
VIEW V-V
FIG. 12
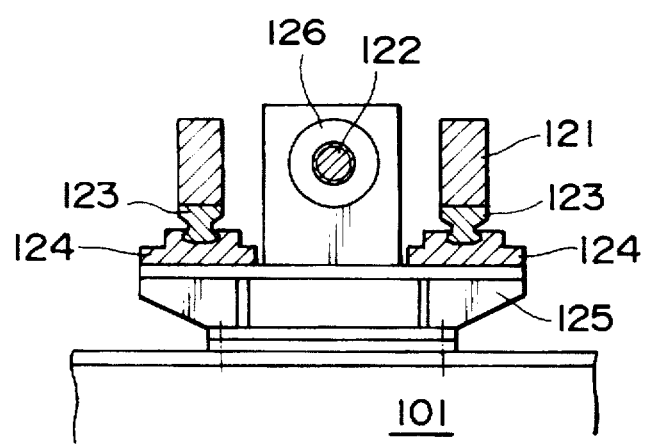
SECTION W-W

SECTION X-X

SECTION Y-Y

F I G. 17
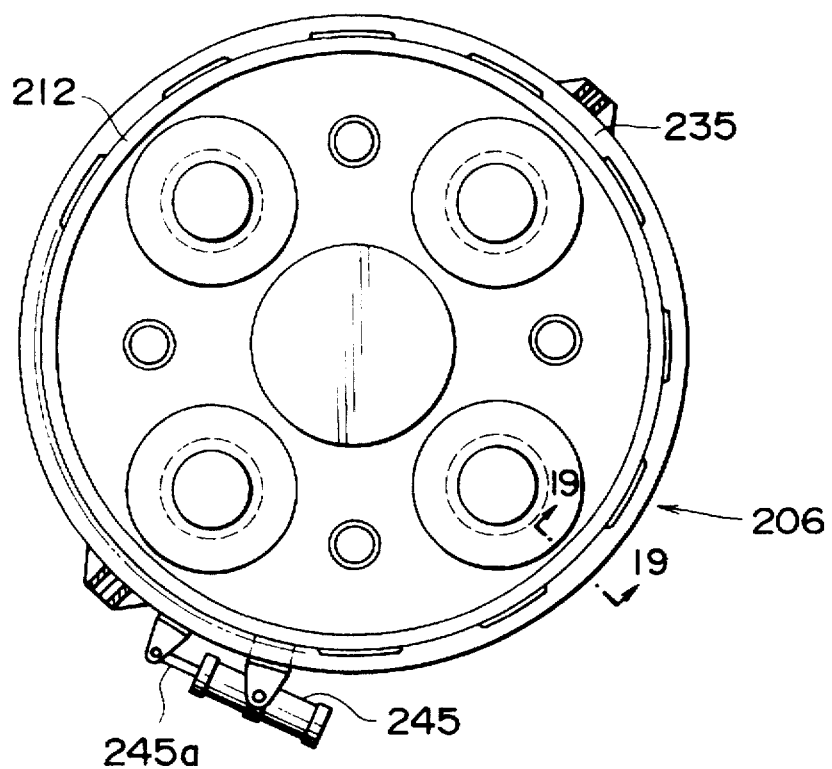

SECTION B-B

SYSTEM CONFIGURATION

FIG. 31

MANIPULATOR CONTROL PART    ADEPT CONTROLLER

- CONTROL

AUTOMATIC OPERATION
  - 1. MOVEMENT OF A MANIPULATOR
  - 2. CONCURRENT OPERATIONS OF TWO GREEN TIRE LOADERS (WITH A CENTERING FUNCTION PERFORMED BY A VISUAL CORRECTION OF POSITION)
  - 3. CONCURRENT OPERATION OF TWO VULCANIZED TIRE UNLOADERS (WITH A CENTERING FUNCTION PERFORMED BY A VISUAL CORRECTION OF POSITION)
  - 4. OPENING OR CLOSING OF THE PRESS PART AND A SPLIT MOLD OPERATION
  - 5. OPERATION OF THE CENTRAL MECHANISM

MANUAL OPERATION
  - 6. MOLD REPLACING OPERATION
  - 7. PLUG EXCHANGING OPERATION
  - 8. CALIBRATION OF CAMERA POSITION FOR VISUAL CORRECTION
  - 9. INITIAL SET PARAMETERS FOR THE ROBOT AND THE CAMERA ARE INPUTTED.
  - 10. TEACHING OF THE LOADER / UNLOADER ROBOT

} FOUR SET FOR EACH OF THE MANIPULATORS

- 11. SINGLE OPERATION OF EACH OF THE ACTUATORS
  - 12. HYDRAULIC UNIT CONTROL
  - 13. EMERGENCY STOP AND INTER-LOCK

- COMMUNICATION
  - 14. COMMUNICATION WITH THE CONCENTRATED COMPUTER (WIRELESS SPECIFICATION OF RS232C)

- MONITOR DISPLAY AND OPERATION
  - 15. STATE DISPLAY WITH A LIQUID CRYSTAL PANEL SUCH AS ABNORMAL DISPLAY AND THE LIKE
  - 16. MANUAL OPERATION WITH A TOUCH PANEL

F I G. 33
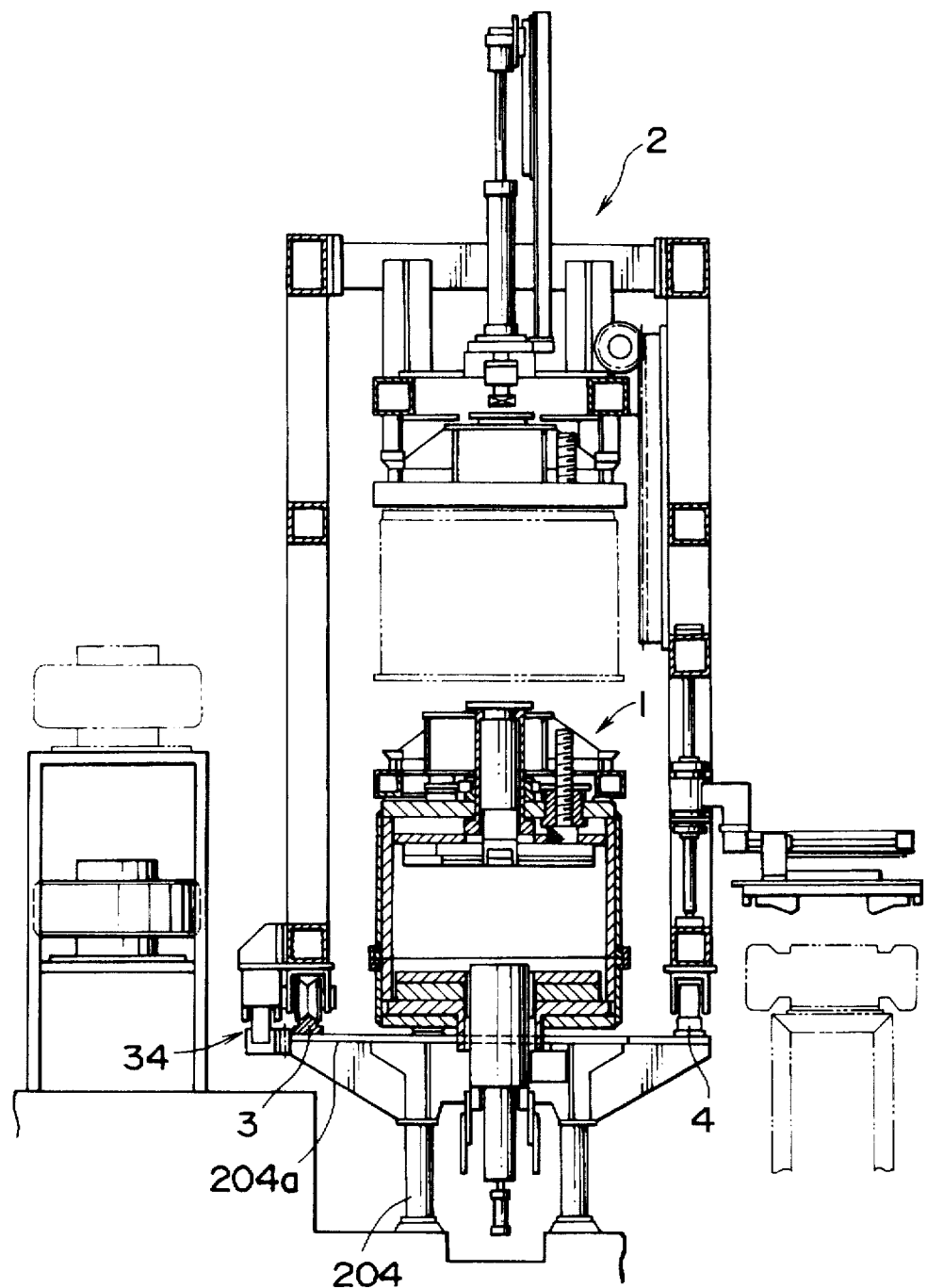

TIRE VULCANIZING SYSTEM

BACKGROUND OF THE INVENTION

1. Field of the Invention

This invention relates to a so-called multi-type tire vulcanizing system comprising a group of tire vulcanizing presses having many tire vulcanizing presses arranged in rows and manipulators arranged along the group of tire vulcanizing presses in such a way that they may be freely run.

2. Description of the Prior Art

The prior art general type tire vulcanizing press is comprised of an upper mold and a lower mold opening or closing devices in respect to one set or two sets of upper and lower molds, loaders for transporting the green tires to a mold center, an unloader for transporting the vulcanized tires to a post-cure inflator center or its near center, a mold height adjusting device and a mold fixing or removing device and the like and this prior art tire vulcanizing device is a self-completed press in which the tire vulcanizing can be carried out.

However, almost of all the cycle times in the tire vulcanizing process are occupied by a vulcanizing time in which the tire is heated while the upper and lower molds are being fastened from each other. Accordingly, a rate of the operating time of devices such as the aforesaid upper and lower molds opening or closing device, loader and unloader operated before and after this vulcanizing operation becomes quite low in respect to the cycle time.

For example, in the system in which the tire for a passenger car is to be vulcanized, the operating time of the device after and before the vulcanizing operation is one minute or less in respect to an entire cycle time of 10 to 15 minutes in the system for vulcanizing the tires for a truck or a bus, the operating time of the device after and before the vulcanizing operation is less than 1 to 2 minutes in respect to the entire cycle time of 40 minutes to one hour. That is, almost of all the devices during the cycle time are being stopped and they are in their free states.

In view of the characteristic of the cycle time of the tire vulcanizing press as described above, it has been proposed in the prior art to provide the multi-type tire vulcanizing system in which the manipulators having the aforesaid devices are operated in sequence in respect to many tire vulcanizing presses.

It is well known in the art to provide a type in which many tire vulcanizing presses are fixedly arranged in one row and then the manipulators run (refer to the gazettes of Jap. Pat. Publn. Nos. Sho 52-44795, 46-24774 and 58-44473), or a type in which many vulcanizing presses are fixedly arranged on a circumference and the manipulators rotate and run around them (refer to the gazettes of Jap. Pat. Laid-Open No.Sho 49-130471 and Jap. Pat. Publn. No. Sho 46-17578), or a type in which the manipulators are fixedly mounted and many tire vulcanizing presses run (refer to the gazettes of Jap. Pat. Publn. No. Sho 46-32497 and Jap. Pat. Laid-Open No. Sho 62-290507).

However, the aforesaid multi-type vulcanizing system has been terminated as its mere stage of idea and the system had not been used widely in the practical tire vulcanizing operation. Its reason consists in the fact that there is not provided an arrangement for a tire vulcanizing system for forming a tire having a superior balance accuracy. For example, although a high accurate transportation of the green tire to the tire vulcanizing press center, a high accurate holding of the green tire when a shaving is carried out, and a high accurate transportation of the vulcanized tire to the post cure inflator center or the like are required in order to form the tire having the superior balance accuracy, system having these requirements therein is not provided yet.

In addition, the multi-type tire vulcanizing system proposed in the gazette of the recent Jap. Pat. Laid-Open No. Hei 4-323010 has been assembled with the recent mechanism of the tire vulcanizing press and this is advanced from the prior art multi-type tire vulcanizing system.

This new multi-type tire vulcanizing system is comprised of a group of tire vulcanizing presses having many tire vulcanizing presses arranged in one row, and manipulators arranged in such a way that they are freely run on running passages installed along the group of the tire vulcanizing presses, and mold preparation stations at the proper locations in the running passage, wherein its main object is to perform an automatic exchanging of the molds.

The mold exchanging in Jap. Pat. Laid-Open No. Hei 4-323010 has a basic concept in which the upper and lower molds are not simply exchanged, but they are exchanged while the upper and lower heating plates (a part of the upper and lower press frames) are being fixed to them. Due to this fact, the mold is replaced or exchanged while a heating fluid supplying or discharging pipe is being fixed or removed against the heating plates. The upper and lower molds having heating plates preheated at the mold preparation station are carried to the desired tire vulcanizing press with the manipulator. In addition, the mold height adjusting device which is similar to that disclosed in the gazette of Jap. Pat. Publn. No. Sho 57-55593 is completely installed at each of the tire vulcanizing presses together with the driving device, wherein after the upper and lower molds having the heating plates are fixed to the tire vulcanizing presses, its height adjustment is carried out.

The multi-type tire vulcanizing system described in the gazette of Jap. Pat. Laid-Open No. Hei 4-323010 has the following problems. First, due to formation of a tire having a superior balance accuracy, its structure provides a hard problem in high precision transportation of the green tire to the tire vulcanizing press center, a high precision green tire holding during shaving operation, and a high precision transportation of the vulcanized tire to the post cure inflation center. That is, the free-running manipulator is of a large gate-type crane and it is practically impossible to get a stopping position accuracy of a scale of 1/10 mm, and so an installing tolerance of the running passage for rails or the like, an error in a running mechanism, an error of the gate-type crane itself and error of each of the devices are accumulated, resulting in that a transportation error of a unit of mm may be generated in the loader and the unloader.

Secondly, as the mold replacement is carried out while the heating plates are being fixed, the heating fluid supplying or discharging pipe is fixed or removed, resulting in that it is transported up to the mold preparation station together with the upper press mold by using the manipulator, and thus it shows some problems that the structure of the manipulator is too complex and its cost is increased.

Third, under an assumption of providing the actual multi-type tire vulcanizing system, there is a possibility that it is necessary to perform an inspection or a repairing of the manipulators and in this case there is a problem that all the tire vulcanizing presses controlled by the manipulators to be operated are stopped.

SUMMARY OF THE INVENTION

This invention has been completed in view of the aforesaid problems found in the prior art and it is an object of the present invention to provide the tire vulcanizing system in which at first, a transportation of the green tire with the loader or a transportation of a vulcanized tire with an unloader can be performed under a high accuracy. Second, the present invention provides a tire vulcanizing system of entire low cost under a proper arrangement of devices such as the manipulator and the tire vulcanizing press. Third, the present invention provides the tire vulcanizing system in which a rate of operation of the tire vulcanizing press is not decreased when the inspection or repairing of the manipulators is carried out.

The tire vulcanizing system for accomplishing the aforesaid first object is comprised of, as its gist, a group of tire vulcanizing presses having many tire vulcanizing presses arranged therein and the manipulators arranged along the group of the aforesaid tire vulcanizing presses in such a way that they may run freely;

the aforesaid tire vulcanizing presses being constructed such that the upper mold and the lower mold are stored between the upper press member and the lower press member which can be engaged or disengaged in such a way that the molds can be fastened from each other, a green tire mounting block and a post-cure inflator are arranged around the presses;

the aforesaid manipulators having a slide which can be connected to the aforesaid upper press in such a way that the slide may be lifted up or descended, comprising a loader for transporting the green tire from the aforesaid green tire mounting block to the aforesaid mold center and an unloader for transporting the vulcanized tire from the aforesaid mold center to the aforesaid post-cure inflator center or its adjoining center;

the aforesaid manipulator being provided with means for setting a position after stopping in respect to the desired tire vulcanizing press; and at least one of the aforesaid loader and unloader being provided with a centering correction means for accommodating an error in stopping position caused by the aforesaid position setting means.

Then, it is preferable that the aforesaid centering correction means causes the loader and/or unloader having two degrees of freedom capable of turning chucks holding the tire within a horizontal plane and ascending or descending the chucks in a vertical direction to have three degrees of freedom for adding an extendable or retractable operation within the horizontal plane, and the loader and/or unloader is provided with a visual sensor for sensing a reference related to the center of more than one of the green tire mounting block, the molds or the post-cure inflator.

The tire vulcanizing system for accomplishing the aforesaid second object is comprised of, as its gist, a group of tire vulcanizing presses having many tire vulcanizing presses arranged in rows and manipulators arranged along the aforesaid group of tire vulcanizing presses in such a way that they may be freely run;

the aforesaid tire vulcanizing presses storing the upper mold and the lower mold between the upper press and the lower press which can be engaged or disengaged in such a way that the molds can be fastened;

the aforesaid manipulators having slides which can be connected to the aforesaid upper press member in such a way that the slide may be lifted up or descended;

the aforesaid tire vulcanizing press being provided with a mold fixing or removing device for fixing the aforesaid upper mold to the aforesaid upper press member in such a way that it may be fixed or removed, and with mold height adjusting devices for use in storing the upper and lower molds having different height sizes within the aforesaid upper and lower press members;

the aforesaid manipulators being provided with a first driving device and a second driving device for driving the aforesaid mold engaging or disengaging device and the mold height adjusting devices in such a way that they may be freely connected; and a mold replacement being carried out simply with the upper and lower molds by separating the aforesaid upper mold from the aforesaid upper press frame by the aforesaid mold engaging or disengaging device and after replacement of the mold, the mold height being adjusted by the aforesaid mold height adjusting device.

Then, it is preferable that the aforesaid upper mold and lower mold are split-type molds, wherein the aforesaid tire vulcanizing presses are provided with the split-mold operating device and the aforesaid manipulators are provided with a third driving device which can be freely connected for use in driving the split-mold operating device.

The tire vulcanizing system for accomplishing the aforesaid third object is comprised of, as its gist, a group of tire vulcanizing presses having many tire vulcanizing presses arranged in one row and manipulators arranged to be freely run on the running passages set along the aforesaid group of tire vulcanizing presses;

both ends of the aforesaid running passages being provided with a first retracting station and a second retracting station for the aforesaid manipulators; and approximate intermediate location of the aforesaid running passages being provided with a right angle running passage and then the third retracting station for the aforesaid manipulators being arranged on this right angle running passage.

Another tire vulcanizing system for accomplishing the aforesaid third object is comprised of, as its gist, a group of tire vulcanizing presses having many tire vulcanizing presses arranged in a row and manipulators arranged on the running passages set along the aforesaid group of tire vulcanizing presses in such a way that they may be freely run;

the aforesaid tire vulcanizing presses storing the upper mold and the lower mold between the upper press member and the lower press member which can be engaged or disengaged in such a way that they can be fastened;

the aforesaid manipulators having the slides which can be connected to the aforesaid upper press member in such a way that they can be lifted up or descended;

a manipulator control part for controlling an operation of each of the aforesaid manipulators and a press control part for controlling an operation of more than one of the aforesaid vulcanizing presses being provided; and a concentrated monitoring computer for totally controlling the manipulator control part and the press control part being provided and this concentrated monitoring computer being capable of changing a corresponding relation between the aforesaid manipulator control part and the press control part.

In the tire vulcanizing system for accomplishing the first object, the manipulator runs toward the tire vulcanizing press where the vulcanization is being finished, the position setting means is operated and then stops at a predetermined position of the tire vulcanizing press. Then, the upper press member moved away from the lower press member is connected to the slide, the slide is lifted up so as to open the upper and lower molds. Then, it is transported by the unloader from the mold center of the vulcanized tire to the post-cure inflator or its near center, although a displacement of the center caused by an error in stopping position of the manipulator is accommodated by the centering correction means for the unloader, and it is transported accurately toward the post-cure inflator or its near center. Then, although the green tire is transported by the loader from a placing table center to the press center, a displacement of the center caused by an error in stopping position of the manipulator is accommodated by the centering correction means for the loader, the tire is accurately transported to the mold center so as to perform a shaving. Then, the slide of the manipulator descends to close the upper and lower molds, the connected state between the manipulator and the upper press member is released and the manipulator runs toward the next tire vulcanizing press.

Since the centering is carried out within the horizontal plane in the tire vulcanizing system for accomplishing the first object, the visual sensor in the loader and/or unloader detects a reference related to the mold center or the post-cure inflator so as to calculate an error in stopping position and then the loader and/or unloader which can be turned and extracted or retracted within the horizontal plane performs a turning operation and an extending or retracting operation for accommodating the detected error in the stopping position.

In the tire vulcanizing system for accomplishing the second object, the manipulator runs toward the tire vulcanizing press requiring a mold replacement and stops there. Then, the first driving device for the manipulator drives the old fixing or removing device for fixing the upper mold to the upper press member so as to remove the upper mold from the upper press member. The upper press removed from the lower press is connected to the slide, the slide ascends to lift up the upper press and causes the upper and lower molds to be left at a lower position. The upper and lower molds are replaced by operating a mold replacing boggie or the like. As new upper and lower molds are fixed, the slide descends to lower the upper press member, the mold height adjusting device is driven by the second driving device for the manipulator, the upper and lower press members are adjusted to be closed, the mold fixing or removing device is driven by the first driving device and then the upper mold is fixed to the upper press member.

In the tire vulcanizing system for accomplishing the second object, an operation of the split-molds after replacing of the molds is carried out by the third driving device for the manipulator.

In the tire vulcanizing system for accomplishing the third object, when the manipulators at both ends of the running passage of one row are to be inspected and repaired, the manipulators are retracted to the first or second retracting stations at both ends, and the remaining manipulators may operate the tire vulcanizing press accommodated by the retracted manipulator. In the case that the manipulator other than those at both ends is to be inspected and repaired, the manipulator is retracted to the third retracting station through the right angle running passage so as not to prohibit a free running of the remaining manipulators and then the manipulator retracted by the remaining manipulators operates the tire vulcanizing press to be accommodated.

In another tire vulcanizing system for accomplishing the third object, when a specified manipulator, for example, is retracted for performing its inspection and repairing work, a replacement in control to which the remaining manipulators can manage is carried out through a concentrated monitoring computer. Similarly, operating conditions are set through the concentrated monitoring computer so as to change the type of tire.

A stopping accuracy of the manipulator itself is thus satisfactorily attained by the normal position setting means and a high accuracy can be kept for a transportation of the green tire to the mold center or a transportation of the vulcanized tire to the post-cure inflator center by the centering correction means for the loader or the unloader, resulting in that it is not necessary to have a high accuracy of the manipulator which can run freely and further it is not necessary to have a high accuracy in installing rails and further a high quality vulcanization can be practically realized in the multi-type tire vulcanizing system.

A mere adding of the extendable or retractable mechanism or the visual sensor to the normal loader or the normal unloader enables a centering correction to be carried out and also enables a high quality vulcanization to be realized without making any complex configuration of the device.

A single mold can be replaced at each of the tire vulcanizing presses even in the case of the multi-type tire vulcanizing system and the mold replacement can be carried out while the piping for the heating plates arranged at the press members is being kept as it is.

It is not necessary to arrange the driving device for the split-mold operating device to each of the tire vulcanizing presses, it is satisfactory to provide a mere arrangement of the third common driving device to the manipulator and so a structure of each of the tire vulcanizing presses is simplified.

When more than three manipulators are used in the tire vulcanizing presses arranged in one row, other manipulators can perform their operations whatever manipulators may be stopped and thus an operating rate of the tire vulcanizing system can be improved.

Inspection or repairing of the manipulator as well as accommodation for replacement of tire type can be easily carried out and a factory automation can be realized as an entire tire vulcanizing system.

BRIEF DESCRIPTION OF THE DRAWINGS

FIG. 11 is a view taken along a line V—V of FIG. 10.

FIG. 12 is a sectional view taken along a line W—W of FIG. 10.

FIG. 17 is a sectional view taken along a line C—C of FIG. 16 for showing a lock device.

FIG. 31 is a view for showing operation items in the manipulator control part.

FIG. 33 is a side elevational view for showing another tire vulcanizing system.

DESCRIPTION OF THE PREFERRED EMBODIMENTS

Figure 1:
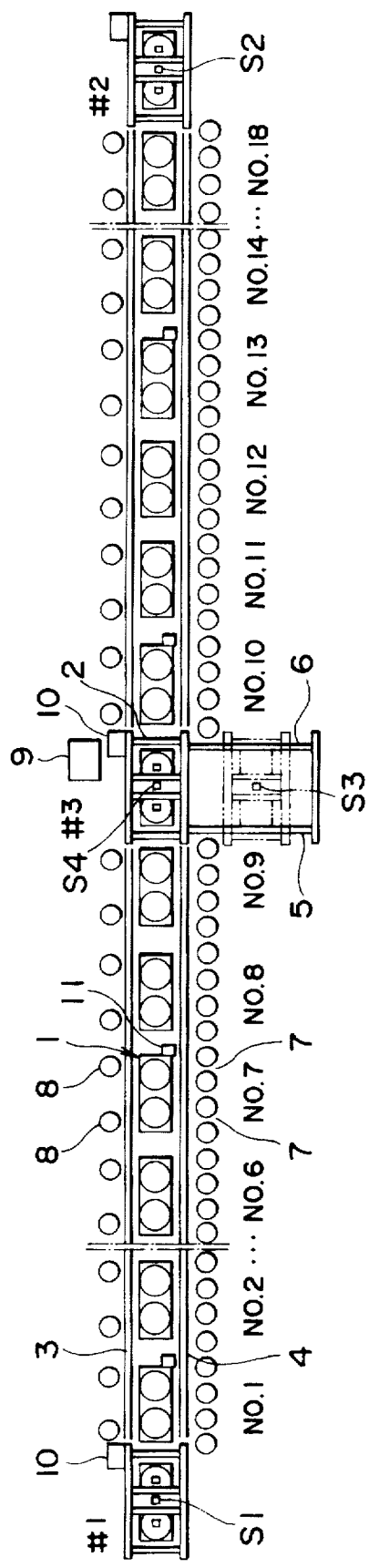
FIG. 1 is a top plan view for showing the tire vulcanizing system of the present invention.
Figure 2:
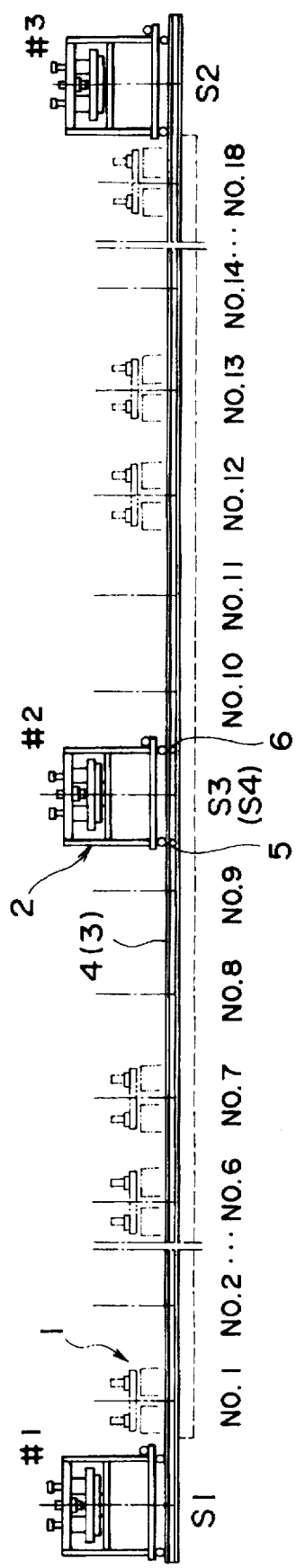
FIG. 2 is a side elevational view for showing the tire vulcanizing system of the present invention.

Referring now to the drawings, some preferred embodiments of the present invention will be described as follows. FIGS. 1 and 2 illustrate schematically the tire vulcanizing system of the present invention, wherein FIG. 1 is a top plan view and FIG. 2 is a side elevational view.

In FIGS. 1 and 2, the tire vulcanizing system is comprised of 18 tire vulcanizing presses Nos. 1 to 18 and manipulators 2 of Nos. 1 to 3.

The manipulators 2 can run freely on the rails 3 and 4 forming linear running passages. The left end of the running passage becomes a first retracting station also acting as a home station S1 for the manipulator 2 of No. 1, the right end of the running passage becomes a second retracting station for the manipulator 2 of No. 2 also acting as a home station S2, the central part of the running passage becomes a home station S4 for the manipulator 2 of No. 3.

Rails 5 and 6 are arranged at a right angle in respect to the rails 3 and 4 of the home station S4 so as to form a right angle running passage. The end of the right angle running passage becomes a third retracting station S3 for the manipulation 2 of No. 3. Home stations S1, S2 and S4 are stations for waiting in the case that the manipulators 2 of Nos. 1, 2 and 3 have a sufficient time for the next operation. The first, second and third retracting stations S1, S2 and S3 are stations for a retracting operation not prohibiting any running of other manipulators 2 in the case that the manipulators 2 of Nos. 1, 2 and 3 are to be inspected and repaired. It is possible that the number of manipulators 2 in respect to the first, second and third retracting stations S1, S2 and S3 is not limited to three, but it may exceed one or two or three manipulators.

The tire vulcanizing presses 1 of Nos. 1 to 9 are placed between the rails 3 and 4 and arranged in one row with a desired interval between the first retracting station S1 and the home station S4. The tire vulcanizing presses 1 of Nos. 10 to 18 are similarly placed between the rails 3 and 4 and arranged in one row at the desired interval between the second retracting station S2 and the home station S4. Then, as a whole, they form a group of tire vulcanizing presses of one row. In the usual production factory, many rows of the parallel groups of the tire vulcanizing presses are arranged.

Then, the manipulator 2 of No. 1 may act against six tire vulcanizing presses 1 of Nos. 1 to 6, the manipulator 2 of No. 2 may act against six tire vulcanizing presses 1 of Nos. 7 to 12, and the manipulator 2 of No. 3 may act against six tire vulcanizing presses 1 of Nos. 13 to 18, respectively.

One tire vulcanizing press 1 has a pair of molds and is also a twin-type for performing a concurrent vulcanization of two tires. Due to this fact, two green tire mounting tables 7 capable of mounting two green tires at one surface of a front side of one tire vulcanizing press 1 are directly installed on the floor. Two post-cure inflators 8 are fixedly mounted at a rear side of one tire vulcanizing press 1. The manipulator 2 has a function for opening or closing the molds of each of the tire vulcanizing presses 1, transporting the vulcanized tire from the mold to the post-cure inflator 8 and transporting the green tire from the green tire mounting table 7 to the mold. In addition, the manipulator 2 also has a function for assisting a mold replacement of each of the tire vulcanizing presses 1 semiautomatically or automatically.

Reference numeral 9 denotes a concentrated monitoring computer and one unit of the computer is installed in respect to the group of tire vulcanizing presses. Reference numeral 10 denotes a manipulator control part which is installed in each of the manipulators and there are three units in all. Reference numeral 11 denotes a press control part, the press control part which is common to the three tire vulcanizing presses and six press control parts are installed for tire vulcanizing presses of Nos. 1 to 18. Then, the concentrated monitoring computer 9 totally controls three manipulator parts 10 and six press control parts. In the case that there is one manipulator or there are two manipulators, the number of manipulator control parts is correspondingly decreased.

That is, the concentrated monitoring computer 9 determines a corresponding relation in which the manipulator 2 of No. 1 corresponds to the tire vulcanizing presses 1 of Nos. 1 to 6, for example. If the manipulator 2 of No. 1 is troubled and the manipulator is retracted to the first retracting station S1 for its inspection, all the tire vulcanizing presses 1 of Nos. 1 to 6 are stopped. Then, the corresponding relation between the manipulator and the tire vulcanizing press is optionally changed by the concentrated monitoring computer 9 in such a way that the manipulator 2 of No. 2 corresponds to the tire vulcanizing presses 1 of Nos. 1 to 9 and the manipulator 3 of No. 3 corresponds to the tire vulcanizing presses 1 of Nos. 10 to 18. With such an arrangement as above, an operating efficiency of the tire vulcanizing system is not substantially decreased by a stopped state of some of the manipulators. A setting of the vulcanizing conditions of or operating conditions such as various tire dimensions of the set of three tire vulcanizing presses can be performed by this concentrated monitoring computer 9 and if the vulcanizing cycle times are made different, it is possible to set a proper combination of the manipulator and the tire vulcanizing presses coinciding with the cycle times.

If the tire vulcanizing press 1 and the home stations S1, S4 and S2 of the manipulator 2 are arranged linearly as shown in FIGS. 1 and 2, a layout of parallel arranging of the group of tire vulcanizing presses in many rows can be easily carried out. To the contrary, if the home station 4 at the midway part of the rails 3 and 4 forming the linear running passage is applied as the retracting station, the manipulator is kept stand still, resulting in that a certain trouble may occur in changing of the corresponding relation with other manipulators. In view of this fact, it is constructed such that the home station 4 at the midway part of the rails 3 and 4 is provided with the rails 5 and 6 forming the right angle running passage and this right angle running passage is provided with the third retracting station S3. As the manipulator 2 to be inspected is retracted to the third retracting station S3, a free running of the remaining manipulator on the rails 3 and 4 acting as the original linear running passage is assured, and there is no restriction in changing of the corresponding relation set by the concentrated monitoring computer 9.

In addition, in the tire vulcanizing system shown in FIGS. 1 and 2, the twin type having the tire vulcanizing press 1 and the two molds has been described, although a single type having one mold may also be applied. It is of course apparent that the number of the twin type tire vulcanizing presses 1 operated by one unit of manipulator 2 is not limited to six. 5 to 8 units of manipulators are practically common in motor vehicle tire vulcanizing press 1, and 20 to 25 units of manipulators are practically common in a truck or a bus tire vulcanizing press 1.

Figure 3:
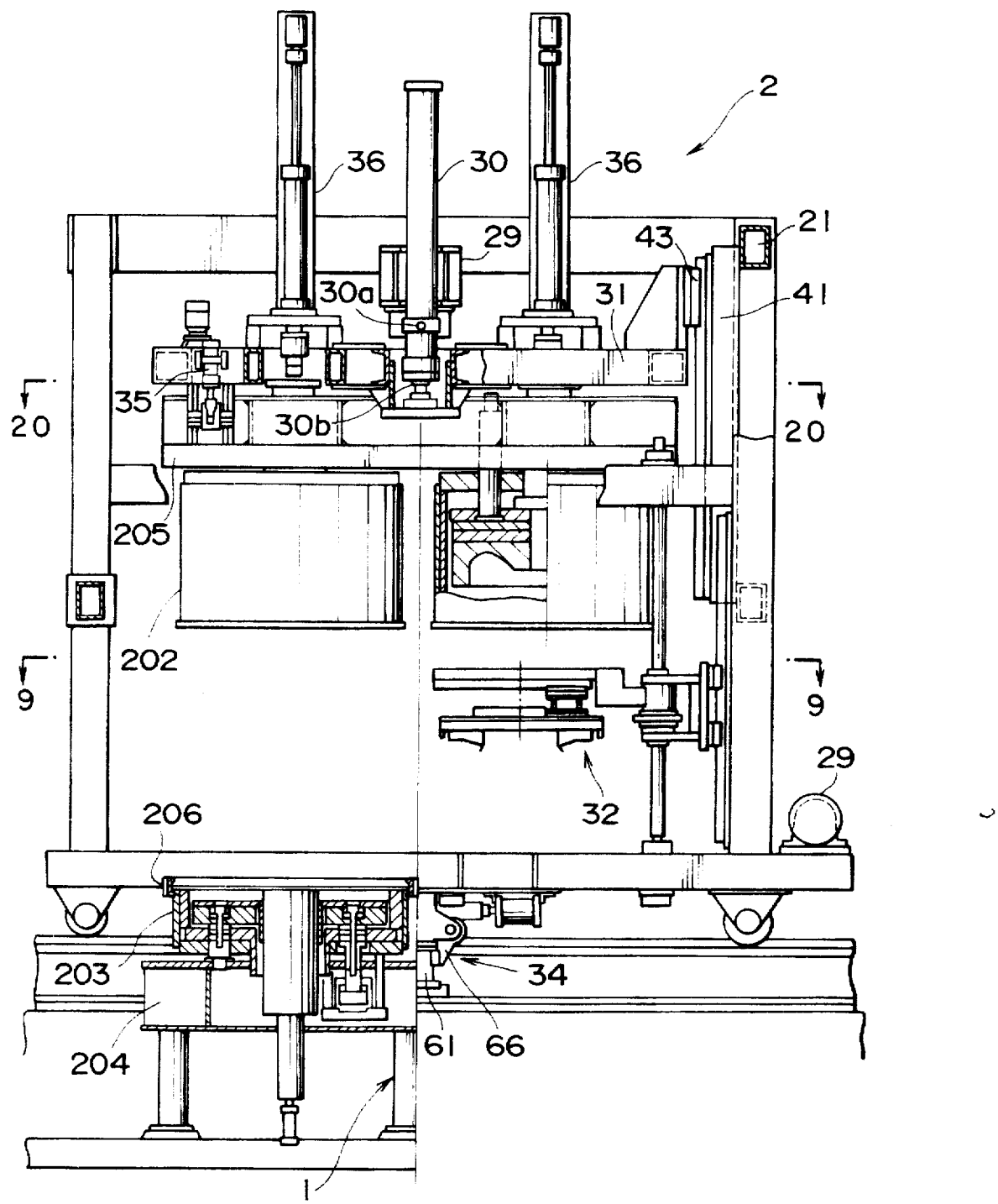
FIG. 3 is a front elevational view for showing the manipulator.
Figure 4:
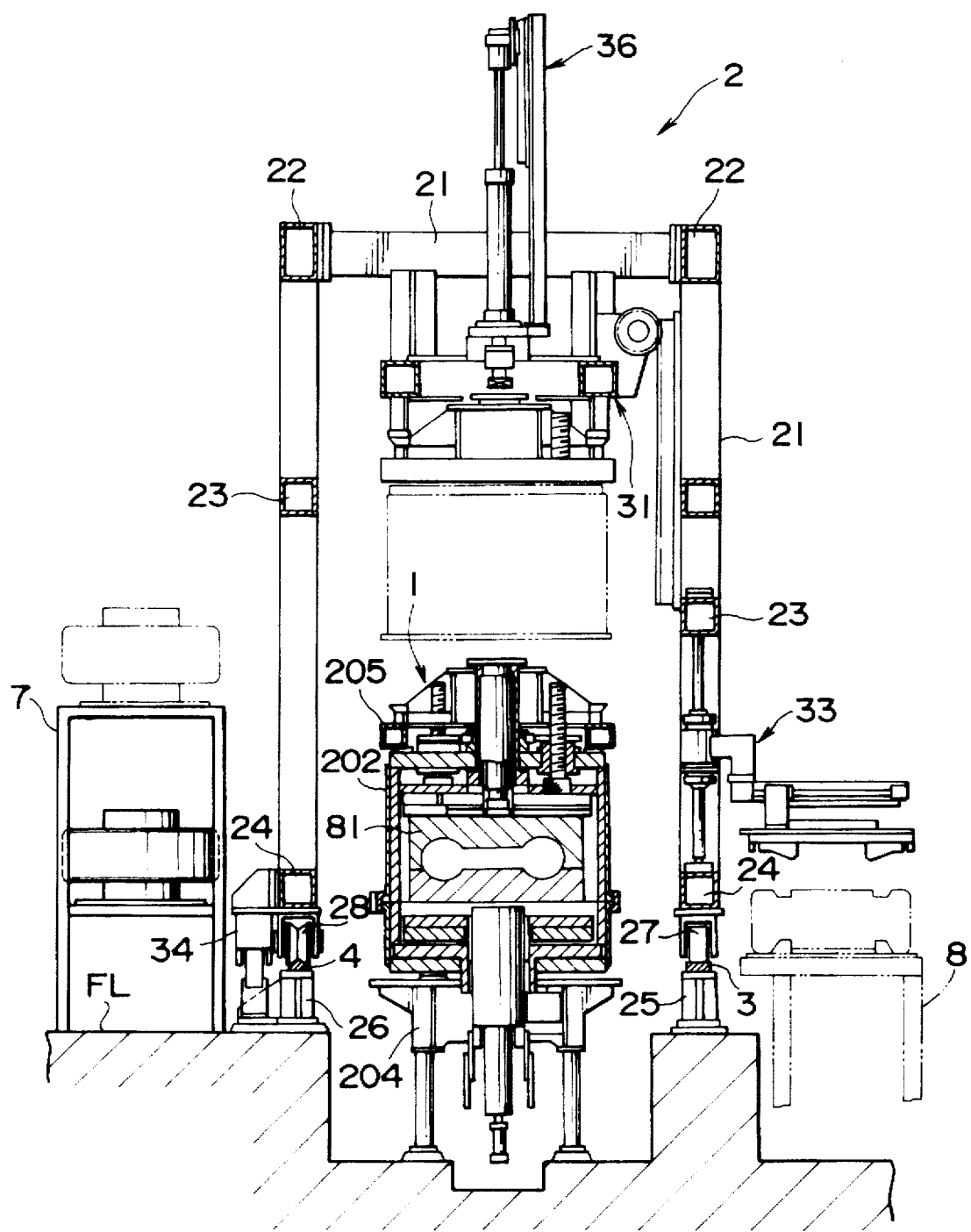
FIG. 4 is a side elevational view for showing the manipulator.
Figure 5:
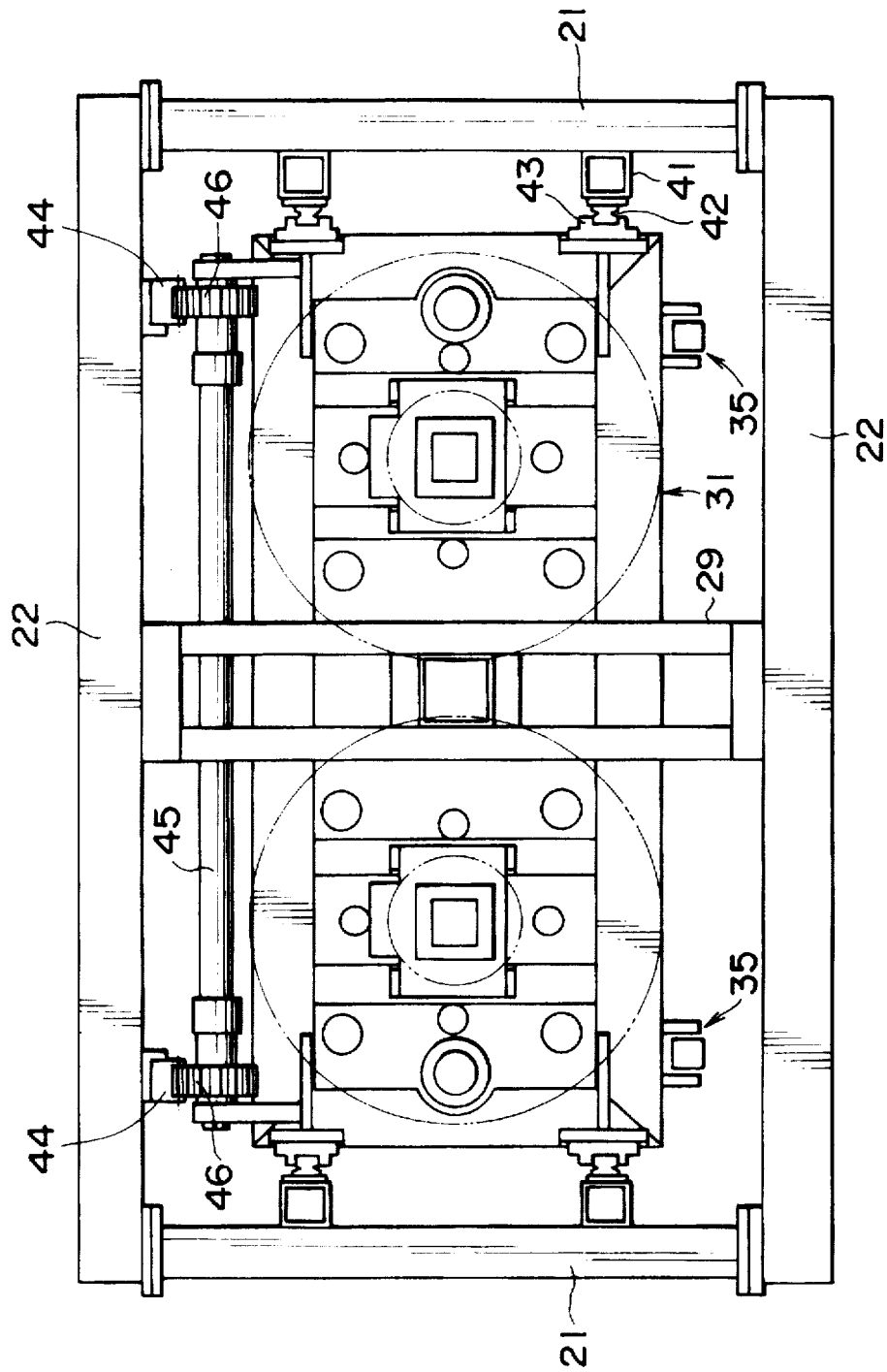
FIG. 5 is a top plan view for showing the manipulator.

Then, referring now to FIGS. 3 to 7, a major structure of the manipulator 2 will be described. FIG. 3 is a front elevational view for showing the manipulator. FIG. 5 is a top plan view for showing the manipulator. FIG. 3 shows a state in which the slide of the manipulator is connected to the tire vulcanizing press and FIG. 4 shows a state in which the manipulator is position set and fixed against the desired closed tire vulcanizing press 1. Reference numeral 7 in FIG. 4 denotes a green tire mounting table and reference numeral 8 denotes a part of the post-cure inflator.

As clearly shown in FIG. 4, the manipulator 2 is constructed in a frame structure in which two gate-type frames 21 running on the flat rail 3 and the mountain-shaped rail 4 are arranged in a thickness direction of the sheet and connected by the lateral frames 22, 23 and 24. One flat rail 3 forming the running passage on which the manipulator 1 runs is installed on the base member 25 mounted on a floor level FL, and the other mountain-shaped rail 4 is installed on the base member 26 mounted on the floor level FL. On the lower surface of the frame structure of the manipulator 2 are pivotally connected the running wheel 27 running on the flat rail 3 and the running wheel 28 running on the mountain-shaped rail 4, and further the running wheel 28 is rotated and driven by a motor 29 (refer to FIG. 3), the manipulator 2 is assured to run along the running passage in the thickness direction of the sheet. The manipulator 2 has a high speed running mode and a low speed running mode, wherein its normal operation is carried out under the high speed running mode and as the manipulator approaches near the desired tire vulcanizing press 1, it runs under a low speed mode and stops at a place near the desired position.

To the frame structure of the manipulator 1 having such a running free means as one described above is fixed the device which is necessary for executing the vulcanizing cycle of the tire vulcanizing press 2. Its major devices are as follows.

At first, the slide 31 for use in opening or closing the mold is arranged in such a way that the slide may freely be lifted up or descended. Second, there is fixed the loader 32 (refer to FIG. 3) for use in transporting the green tire. Third, there is fixed the unloader 33 for use in transporting the vulcanized tire. Fourth, there is provided a position setting means 34 for use in position setting the stopping position of the manipulator 1 to its desired position. In addition, to the aforesaid slide 31 are fixed a connector means with the tire vulcanizing press 1 (refer to FIG. 3) and the third driving device 36 for use in driving the split-mold operating device or the like.

Then, means for freely lifting-up or descending the slide 31 will be described. As clearly shown in FIG. 5, four guide ways 42 are fixed inside the gate-type frames 21 and 21 through rectangular angles 41 in a vertical direction. Then, to the slide 31 is attached a linear motion guide 43 sliding along the guide way 42. In addition, a vertical frame 29 is arranged between the lateral frames 22 and 22. As shown in FIG. 3, a pin 30a of a press opening or closing cylinder 30 is pivotally arranged at the central part of the vertical frame 29, and the extremity end fitting 30b of the press opening or closing cylinder 30 is connected to the slide 31. As this press opening or closing cylinder 30 is retracted, the slide 31 is lifted up and in turn as the cylinder is extended, the slide 31 descends. A horizontal degree is important when the slide 31 is lifted up or descends and so there is provided a horizontal degree keeping device for keeping a horizontal degree during lifting-up or descending operation of the slide.

In FIG. 5, the horizontal degree keeping device is comprised of two racks 44 and 44 fixed to the inner vertical direction of one lateral frame 22, and a coaxial shaft 45 which is pivotally supported at the slide 31 and has pinions 46 and 46 engaged with the two racks 44 and 44 fitted therein. Lifting-up or descending operation keeping the horizontal degree of the slide 31 is assured by the coaxial shaft 45.

Figure 6:
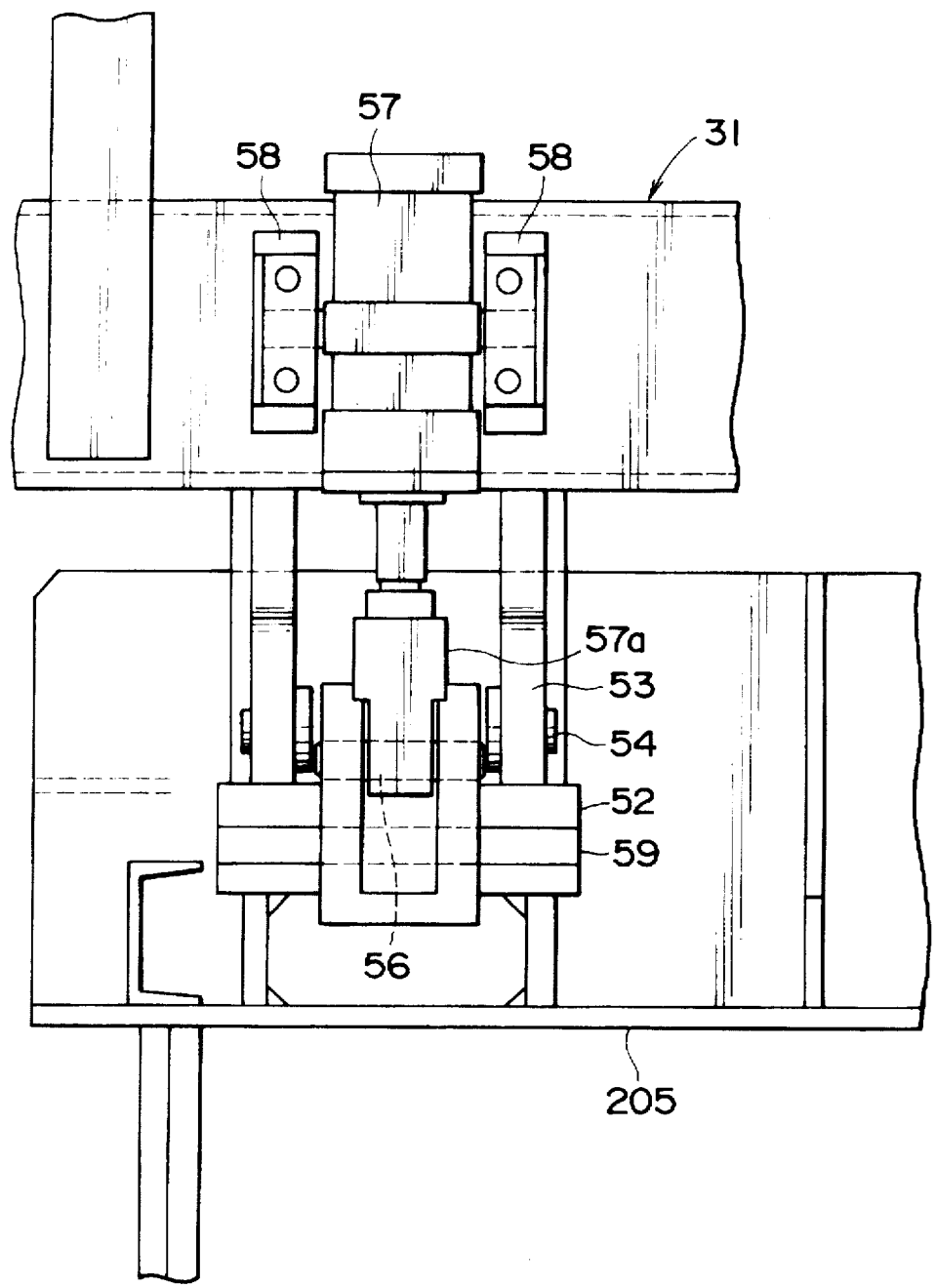
FIG. 6 is a front elevational view for showing a connector means.
Figure 7:
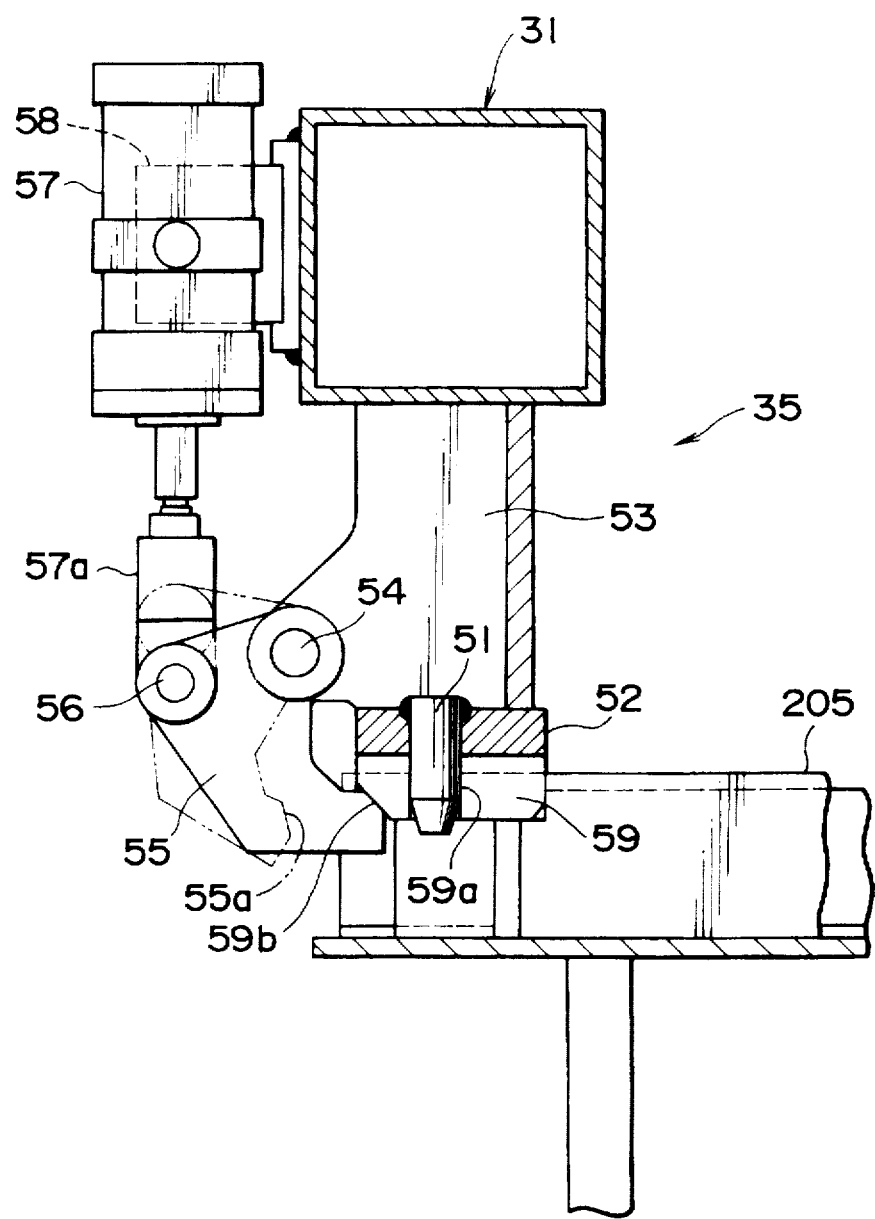
FIG. 7 is a side elevational view for showing a connector means.

A total number of four connector means 35 are arranged by every two units at two long sides of the slide 31 having a rectangular shape as viewed from above so as to enable the connection with the upper press member of the tire vulcanizing press described later to be freely carried out. A structure of the connector means will be described in reference to FIGS. 6 and 7. FIG. 6 is a front elevational view and FIG. 7 is a side elevational view. To the lower surface of the slide 31 is fixed a bracket 53 having a horizontal abutting plate 52 having the downward directed pin 51 projected. A claw 55 is pivotally supported at a shaft 54 of the bracket 53. An extremity end fitting 57a of a hydraulic cylinder 57 is pivotally supported at the shaft 56 of the claw 55. The hydraulic cylinder 57 is oscillatably supported at the side surface of the slide 31 through a trunion bracket 58. A receiving plate 59 abutted against the horizontal abutting plate 52 is fixed to the upper link 205 constituting a part of the upper press member to be described later. The receiving plate 59 is opened with a guide hole 59a facing against the pin 51. A slant part 55a of the claw 55 is abutted against a slant surface 59b of the receiving plate 59.

In FIG. 7, as the hydraulic cylinder 57 is kept at its retracted state, the claw 55 is retracted as indicated by a two-dotted line so as to release its connected state. As the slide 31 descends under a state shown by this two-dotted line, the extremity end of the pin 51 is guided along the guide hole 59a so as to cause the horizontal abutting plate 31 to be abutted against the receiving plate 59. Then, as the hydraulic cylinder 57 is extended, the claw 55 is oscillated as shown by a solid line to cause the slant surface 59b of the upper link 205 to be abutted against the slant part 55a of the claw 55, resulting in that the receiving plate 59 is held between them and connected thereat.

Figure 8B:
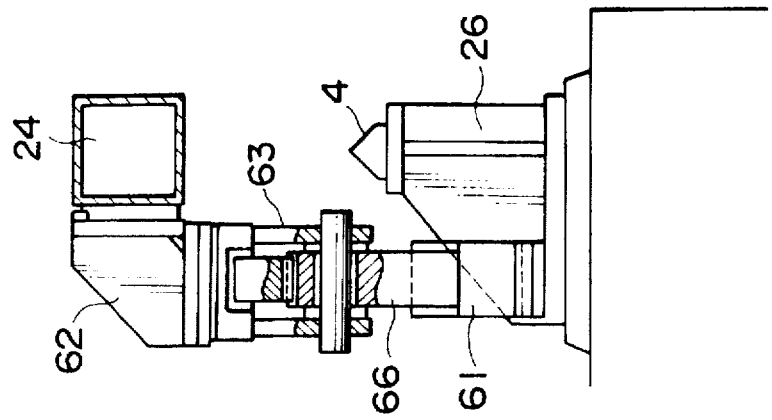
FIG. 8 is a view for showing a position setting means.
Figure 8A:
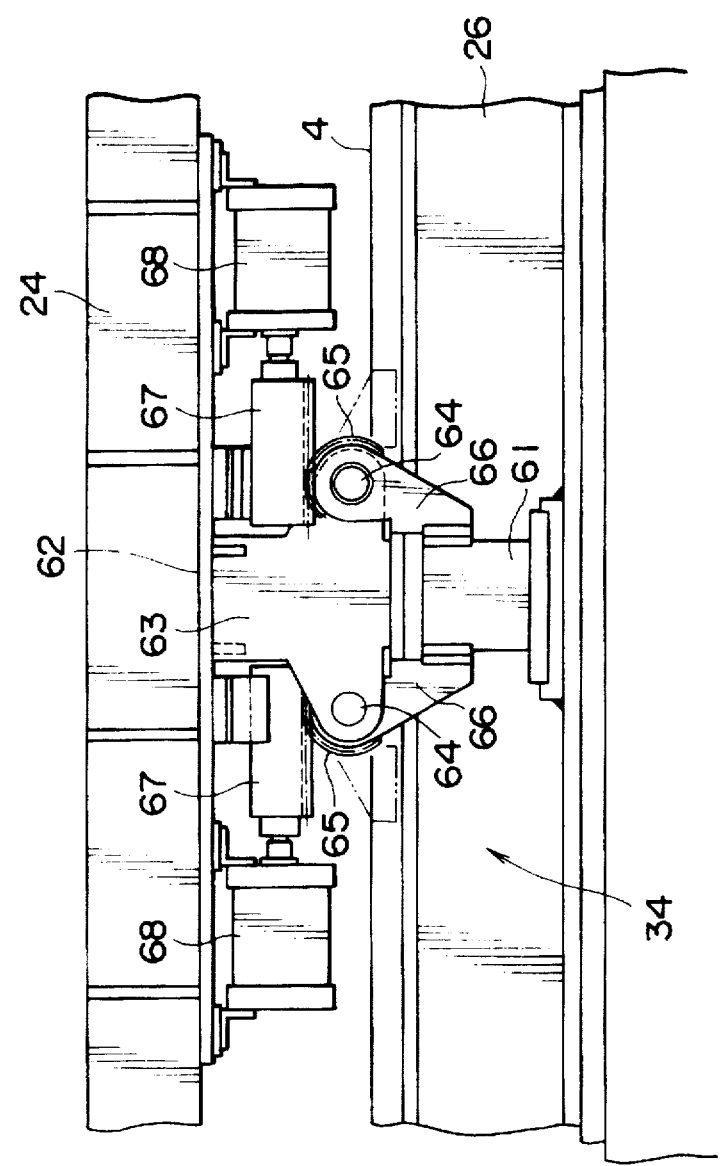

In order to perform this connection with the connector means, it becomes necessary to have such an error in stopping position as one in which the manipulator is stopped at the desired position and the extremity end of the pin 51 is guided along the guide hole 59a. In view of this arrangement, the position setting means 34 arranged in the manipulator will be described in reference to FIG. 8. FIG. 8(a) is a front elevational view and FIG. 8(b) is a side elevational view.

A rectangular block 61 is fixed with bolts or the like to the desired position of the angle member 26 (corresponding to the central position of the tire vulcanizing press) having the mountain-shaped rail 4 installed therein. In turn, a corner bracket 62 is fixed to the side surface of the lateral frame 24 of the manipulator, and a T-shaped bucket 63 is fixed to the lower surface of the corner bracket 62. Holding plates 66 having semi-peripheral pinion 65 are fitted in each of the two shafts 64 and 64 of the T-shaped bracket 63 through keys or the like. Racks 67 and 67 engaged with the semi-peripheral pinions 65 and 65 are arranged in such a way that they may be advanced or retracted along the lower surface of the corner bracket 62.

During running operation of the manipulator, the air cylinders 68 and 68 are kept at their extended states and the holding plates 66 and 66 are opened as indicated by a dotted line so as not to be interfered with the rectangular block 61. As the manipulator is stopped before the desired tire vulcanizing press, the air cylinders 68 and 68 are retracted and then the holding plates 66 and 66 hold the rectangular block 61 as indicated by a solid line. Then, the manipulator is moved up to such a position as one where the rectangular block 61 is set at the center and its position is set. However, although this position setting means 34 can perform a position setting of such a degree as one not hindering against the connection of the aforesaid connector means 35, a stopping position error of mm unit may occur. Then, a transporting accuracy of the loader 32 or the unloader 33 toward the tire vulcanizing press 1 or the post-cure inflator 8 is correspondingly disordered. This stopping position error in mm unit may substantially influence against a balance accuracy of the tire to be formed. Due to this fact, it is not practical to position set the manipulator having a structure similar to a large-sized crane in 1/10 mm unit. In view of this fact, the loader 32 or the unloader 33 itself has centering correction means for accommodating the stopping position error.

Figure 9:
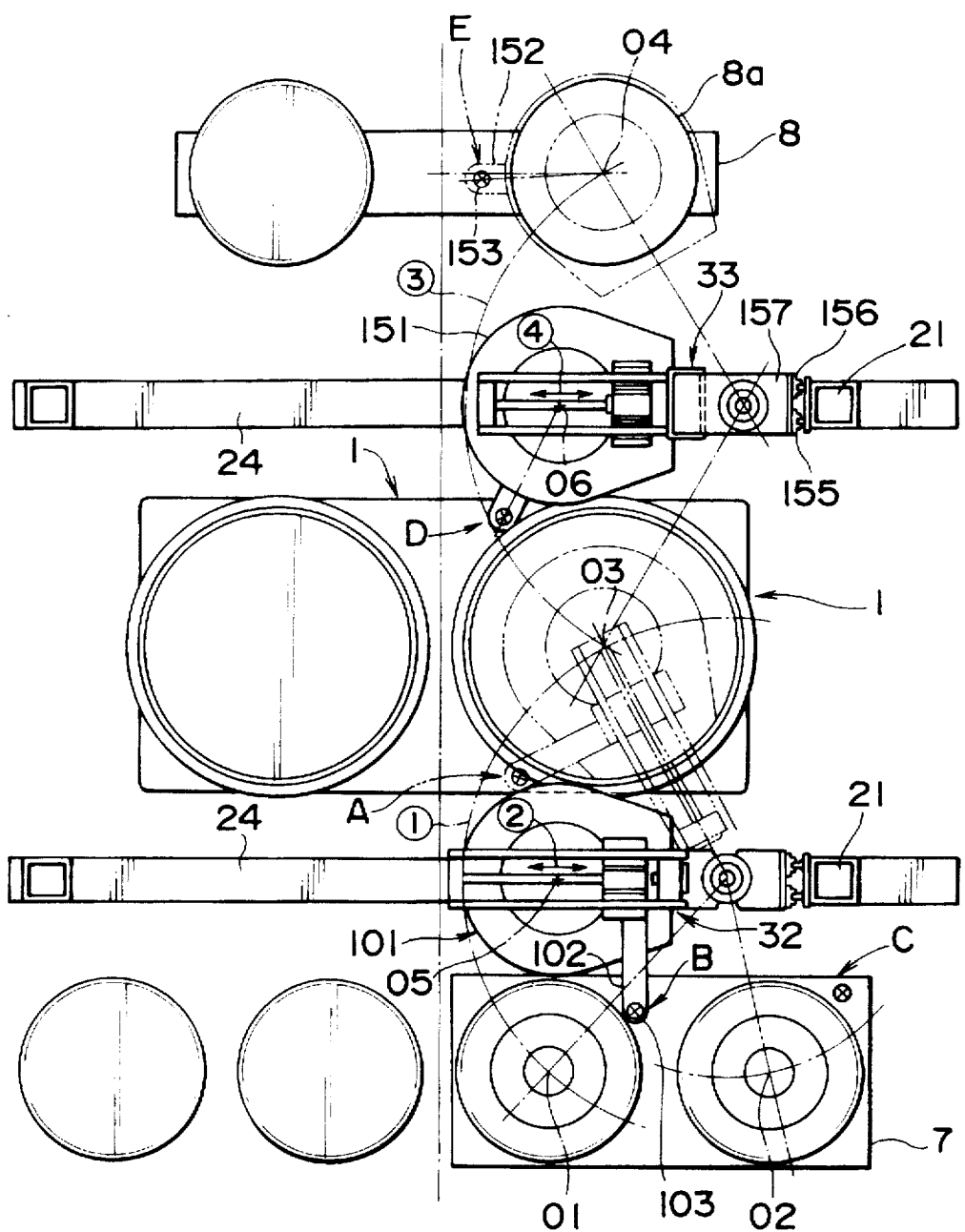
FIG. 9 is a sectional view taken along a line A—A of FIG. 3 for showing upper surfaces of the loader and the unloader, respectively.

Referring now to FIG. 9, the loader 32 and the unloader 33 having the centering correction means will be described. FIG. 9 is a sectional view taken along a line A—A of FIG.

3. Only the right side loader 32 and the unloader 33 are illustrated, similar loader 32 and unloader 33 are arranged symmetrically at the left side around the central line. In addition, reference numeral 8 denotes an advancing position of a rim 8a of the post-cure inflator. The vulcanized tire is mounted accurately on this rim 8a, and the rim 8a is pulled in to a central position of the post-cure inflator not illustrated. However, it is also possible to mount the vulcanized tire directly on the rim of the post-cure inflator without moving the rim 8a of FIG. 9. That is, the position where the unloader 33 should transport it is the rim 8a of the post-cure inflator and the center of the transporting position is present at the post-cure inflator or near the post-cure inflator.

In FIG. 9, the loader 32 has a function to transport the green tire placed at the first center 01 or the second center 02 of the green tire mounting table 7 onto the center of one mold of the tire vulcanizing press 1. In particular, it is important to have an accuracy to transport the green tire to the mold center 03 and then preferably a centering accuracy less than ±0.25 mm is required.

Due to this fact, the loader 32 is operated such that a chuck 101 can be lifted up or descend in a thickness direction of the sheet and it can be turned not only within a horizontal plane as indicated by a dotted line of an arrow ①, but also extended or retracted within the horizontal plane as indicated by an arrow ②. Since a necessity of performing the centering correction is produced within the horizontal plane, it becomes possible to perform a desired correction by the structure which can be turned within the horizontal plane and extended or retracted. That is, the loader 32 has three degrees of freedom of lifting-up or descending, turning and extension or retraction and thus the chuck 101 can be positioned optionally at the positions of X-Y-Z planes.

In order to perform this operation, it is necessary to detect an amount of correction required for centering operation. Thus, a visual sensor 103 such as CCD camera and the like are fixed to a projecting member 102 attached to the chuck 101. In addition, the tire vulcanizing press 1 is provided with a reference mark A placed at a position related to the mold center 03, and the green tire mounting table 7 is provided with reference marks B and C related to the first center 01 and the second center 02.

A reason why the green tire mounting table 7 is provided with the two reference marks B and C and the reference positions are observed and photographed with the visual sensor 103 consists in a possibility that the green tire mounting table 7 is not only displaced in its far or near position but also placed in a slant orientation. In the tire vulcanizing press 1, if one reference mark A is observed and photographed, a centering correction amount of each of the center 05 of the chuck 101 and the mold center 03 can be detected as a value of X-Y coordinates. That is, the centering correction means of the loader 32 is constituted by adding the extendable or retractable structure of the chuck 101 or the visual sensor 103 and the like.

Then, the unloader 33 has a function to transport the vulcanized tire present at the mold center 03 of the tire vulcanizing press 1 up to the rim 8a of the post-cure inflator 8. In particular, it is important to have an accuracy in which the vulcanized tire is transported up to the rim center 04 placed at the center of the post-cure inflator or near the center and preferably it is required to have a centering accuracy of less than ±0.25 mm.

Due to this fact, the unloader 33 is operated such that the chuck 151 can be lifted up or descend in a thickness direction of the sheet, it can not only be turned within a horizontal plane as indicated by a dotted line of an arrow ③, but also it can be extended or retracted within the horizontal plane as indicated by an arrow ④. Since a necessity of correction of the centering is produced within the horizontal plane, it becomes possible to perform a desired correction by the structure which can be turned and extended or retracted within the horizontal plane. That is, the unloader 33 has three degrees of freedom of lifting-up or descending, turning and extension or retraction and enables the chuck 151 to be positioned optionally at any positions in the X-Y-Z planes.

In order to perform this operation, it is necessary to detect a correcting amount required for centering operation. Thus, a visual sensor 153 such as a CCD camera or the like is fixed to the projecting member 152 attached to the chuck 151. In addition, the tire vulcanizing press 1 is provided with a reference mark D placed at a position related to the mold center 03 and the post-cure inflator 8 is provided with a reference mark E related to the rim center 04. Observation and photographing of the reference mark D of the tire vulcanizing press 1 enables the centering correction amounts of the center 06 of the chuck 151 and the mold center 03 to be detected as the X-Y coordinates and further observation and photographing of the reference mark E of the post-cure inflator 8 enables the centering correction amounts of the center 06 of the chuck 151 and PCI rim center 04 to be detected as the X-Y coordinates. That is, the centering correction means of the unloader 32 is constituted by adding the extendable or retractable structure of the chuck 151 or the visual sensor 153 or the like.

Figure 10:
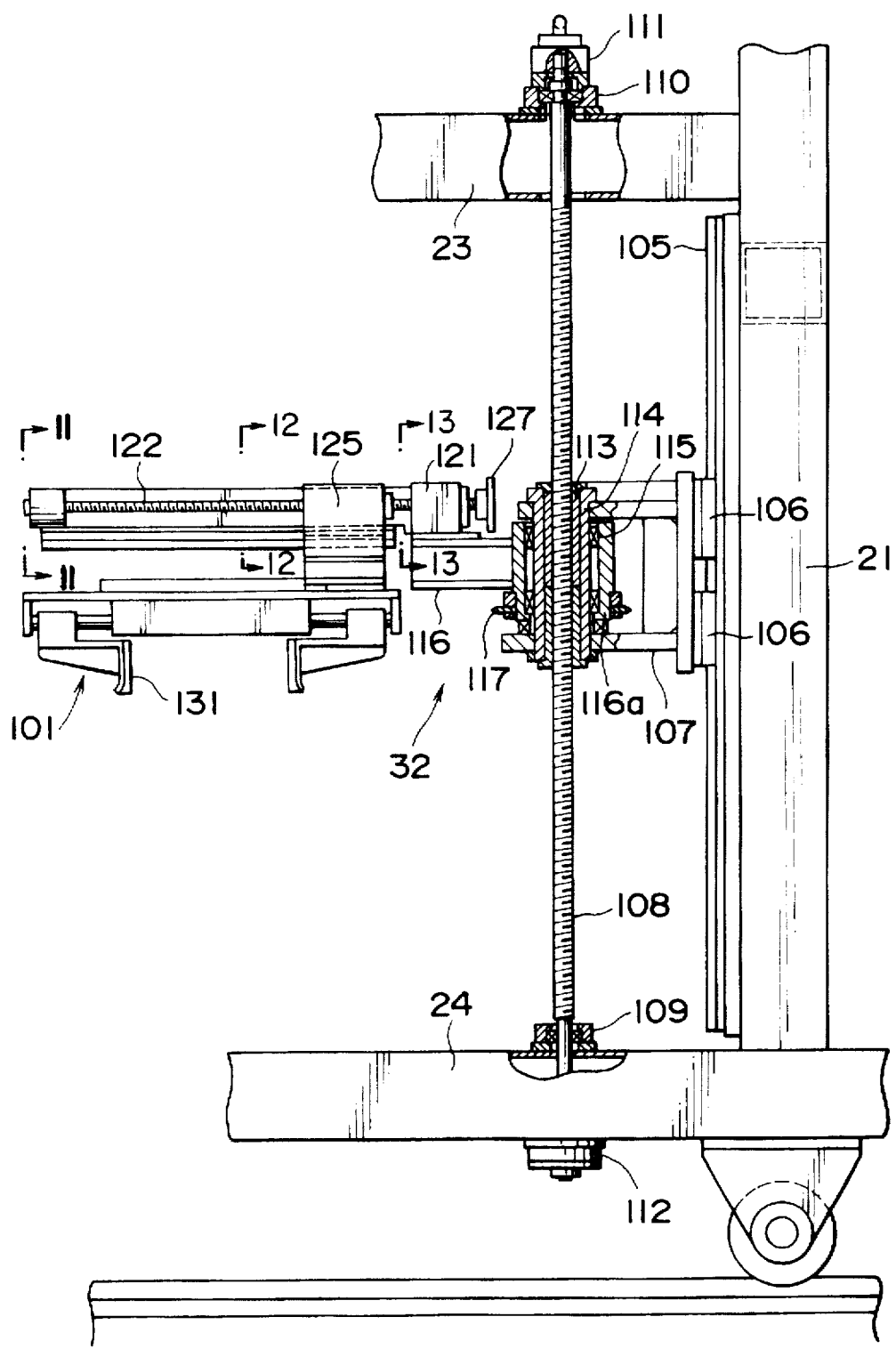
FIG. 10 is a front elevational view for showing the loader.
Figure 13:
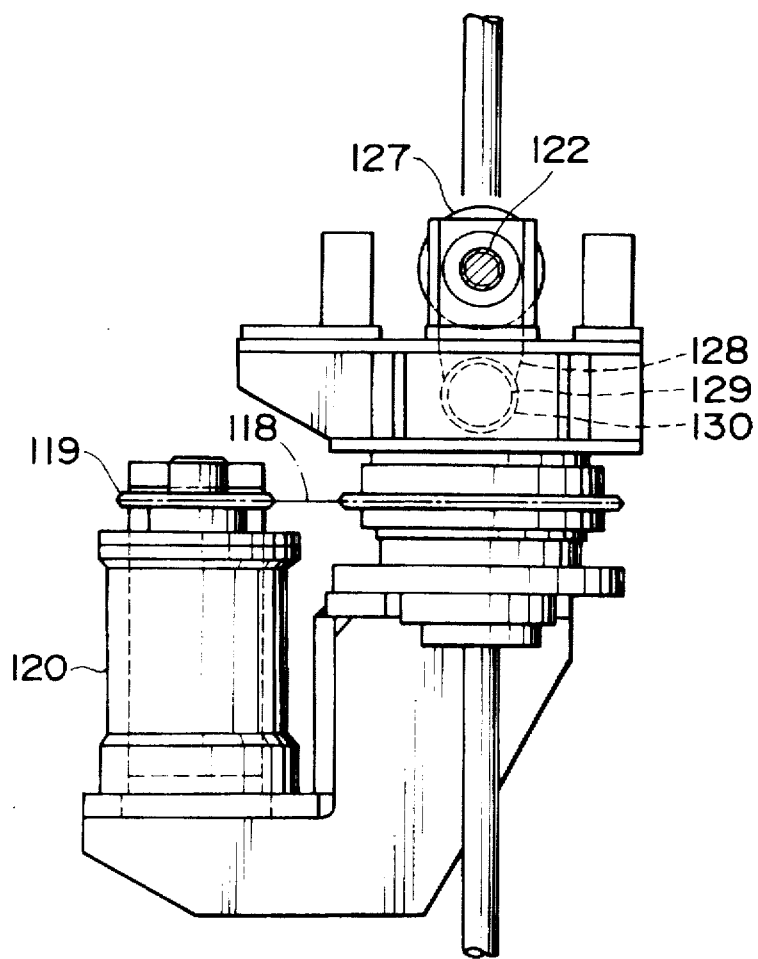
FIG. 13 is a sectional view taken along a line X—X of FIG. 10.

Then, referring to FIGS. 10 to 13, a structure of robot having practical three degrees of freedom of the loader 32 having a centering correction function will be described. FIG. 10 is a front elevational view of the loader 32, FIG. 11 is a view taken along an arrow line V—V of FIG. 10, FIG. 12 is a sectional view taken along a line W—W of FIG. 10, and FIG. 13 is a sectional view taken along a line X—X of FIG. 10.

In FIG. 10, a guide way 105 extending in a vertical direction is attached inside the gate-type frame 21 of the manipulator, and a linear motion guide 106 for sliding the guide way 105 is fixed to the lifting or ascending member 107. In addition, a threaded shaft 108 is rotatably supported at the lateral frames 23, 24 by bearings 109, 110, a servo motor 111 is connected to the upper end of the threaded shaft 108, and a brake 112 is connected to the lower end of the threaded shaft 108. A female thread 113 engaged with this threaded shaft 108 is fitted into a sleeve 114 arranged at the lifting-up or descending member 107, and the lifting-up or descending member 107 is lifted up or descends. That is, a vertical position of the lifting-up or descending member 107 is determined by the servo-motor 111.

In addition, an arm 116 is supported at the outer circumference of a sleeve 114 through a bearing 115 in such a way that it may be freely turned. A sprocket 117 is fitted to a hub part 116a of the arm 116 and connected to the servo motor 120 through a chain 118 and a sprocket 119 as shown in FIG. 13. That is, a turning position of the arm 116 is determined by the servo motor 120.

As shown in FIGS. 10 and 11, a frame 121 is fixed to the arm 116 and a horizontal screw shaft 122 is rotatably supported at the center of the frame 121. In addition, two guide ways 123, 123 are fixed to the lower surface of the frame 121 and as shown in FIG. 12, linear motion guides 124, 124 for sliding the guide ways 123, 123 are fixed to a chuck supporting table 125. To the chuck supporting table 125 is fitted a female screw 126 engaged with the screw shaft 122 and as the screw shaft 122 is rotated, the chuck supporting table 125 is forwarded or retracted in extendable or retractable manner in a thickness direction of the sheet (a horizontal direction) in respect to the frame 121. Returning back to FIG. 10, the sprocket 127 is fitted to one end of the screw shaft 122 and as shown in FIG. 13, it is connected to the servo motor 130 through the chain 128 and the sprocket 129. That is, the extending or retracting position of the chuck supporting member 125 is determined by the servo motor 130.

The chuck 101 is fixed to the lower surface of the chuck supporting member 125, its structure is well known in the art, so that its detailed description is eliminated. However, the chuck is constructed such that many chuck paddles 131 for holding the upper bead of the green tire from inside are fixed in a radial direction in such a way that they may be extended or retracted.

Figure 14:
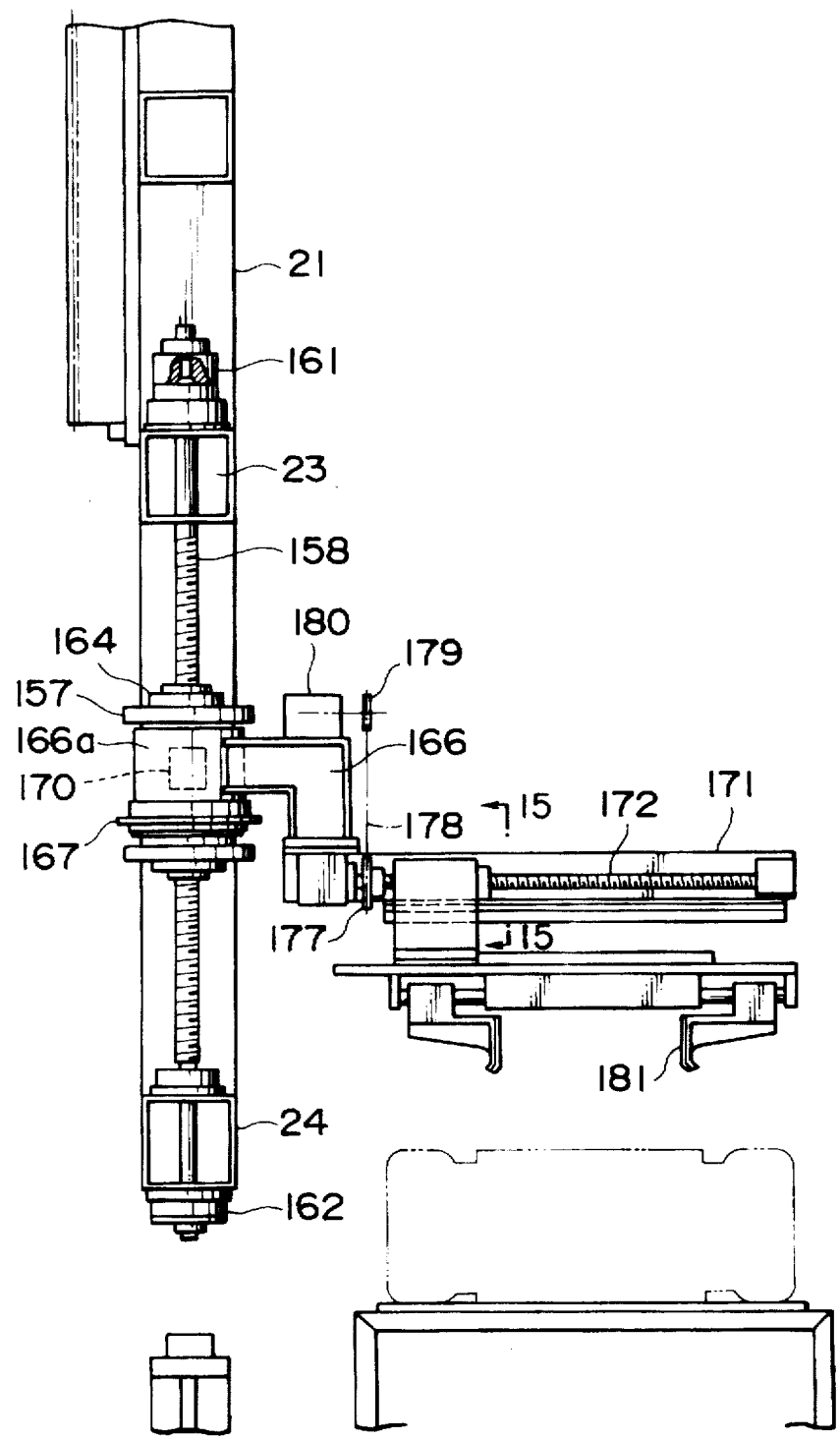
FIG. 14 is a side elevational view for showing the unloader.
Figure 15:
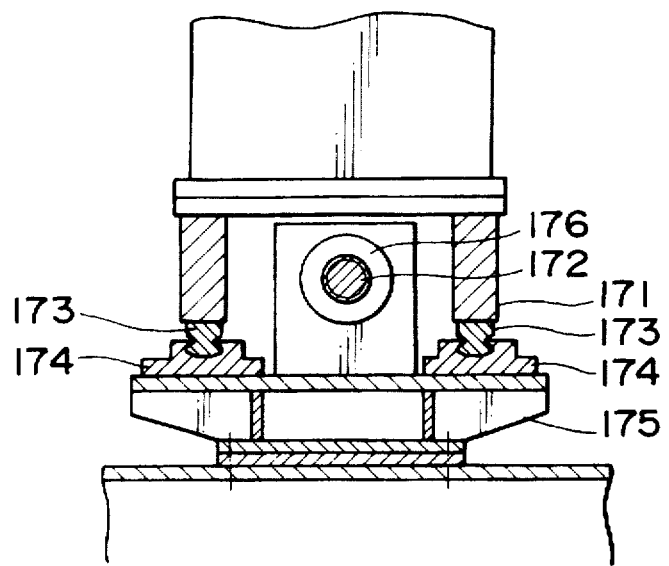
FIG. 15 is a sectional view taken along a line Y—Y of FIG. 14.

Referring to FIGS. 9, 14 and 15, a practical structure of robot having three degrees of freedom of the unloader 33 having the centering correction function will be described. FIG. 14 is a side elevational view of the unloader 32 and FIG. 15 is a sectional view taken along a line Y—Y of FIG. 14. Although its fixing location is different, it has the structure of three degrees of freedom which is similar to that of the loader 32.

In FIG. 9, a guide way 155 extending in a vertical direction is fixed inside the gate-type frame 21 of the manipulator, and a linear motion guide 156 sliding the guide way 155 is fixed to the lifting-up or descending member 157. In FIG. 14, a screw shaft 158 is rotatably supported by bearings at the lateral frames 23, 24, aservo motor 161 is connected to the upper end of the screw shaft 158 and a brake 162 is connected to the lower end of the screw shaft 158. A female thread engaged with the screw shaft 158 is fitted into a sleeve 164 arranged at the lifting-up or descending member 157 and the lifting-up or descending member 157 is lifted up or descends along with a rotation of the screw shaft 158. That is, the vertical position of the lifting-up or descending member 157 is determined by the servo-motor 161.

In addition, an arm 166 is rotatably supported at an outer circumference of the aforesaid sleeve 164 through a bearing. A sprocket 167 is fitted to a hub part 166a of the arm 166 and connected to the servo motor 170 through the chain-sprocket. That is, the rotating position of the arm 166 is determined by the servo motor 170.

The frame member 171 is fixed to the arm 166 and as shown in FIG. 15, a horizontal screw shaft 172 is rotatably supported at the center of the frame 171. In addition, two guide ways 173, 173 are fixed to the lower surface of the frame member 171, and then the linear motion guides 174, 174 for sliding the guide ways 173, 173 are fixed to a chuck supporting table 175. The chuck supporting table 175 is constructed such that a female screw 176 engaged with the screw shaft 172 is fitted into the chuck supporting table and the chuck supporting table 175 is forwarded or retracted along with the rotation of the screw shaft 172 in such a manner that it can be extended or retracted against the frame 171 in a thickness direction (a horizontal direction) of the sheet. Returning back to FIG. 14, the sprocket 177 is fitted into one end of the screw shaft 172 and connected to the servo motor 180 through a chain 178 and a sprocket 179. That is, the extending or retracting position of the chuck supporting member 175 is determined by the servo motor 180.

The chuck 151 is fixed to the lower surface of the chuck supporting member 175, its structure is well known in the art, so that its detailed description will be eliminated and many chuck paddles 181 for holding the upper bead of the vulcanized tire from inside are fixed in a radial direction in such a way that they may be extended or retracted.

Although the fact that the structure of the robot having three degrees of freedom for the loader 32 and the unloader 33 is accomplished by the servo motor has been described, this may not be limited to the servo motor but a servo hydraulic cylinder can be used. In addition, this may not be limited to the vertical moving robot, the turning robot and the extending or retracting robot, but multi-articulation robots may be used.

Then, returning back to FIGS. 3 and 4, the structure of the tire vulcanizing press 1 will be described. This structure is of a twin type in which two dome lock type mold units 201 are held between the lower press base 204 and the upper link 205. The structure of each of the dome lock type mold units 201 will be described in, reference to the sectional view of FIG. 16.

Figure 16:
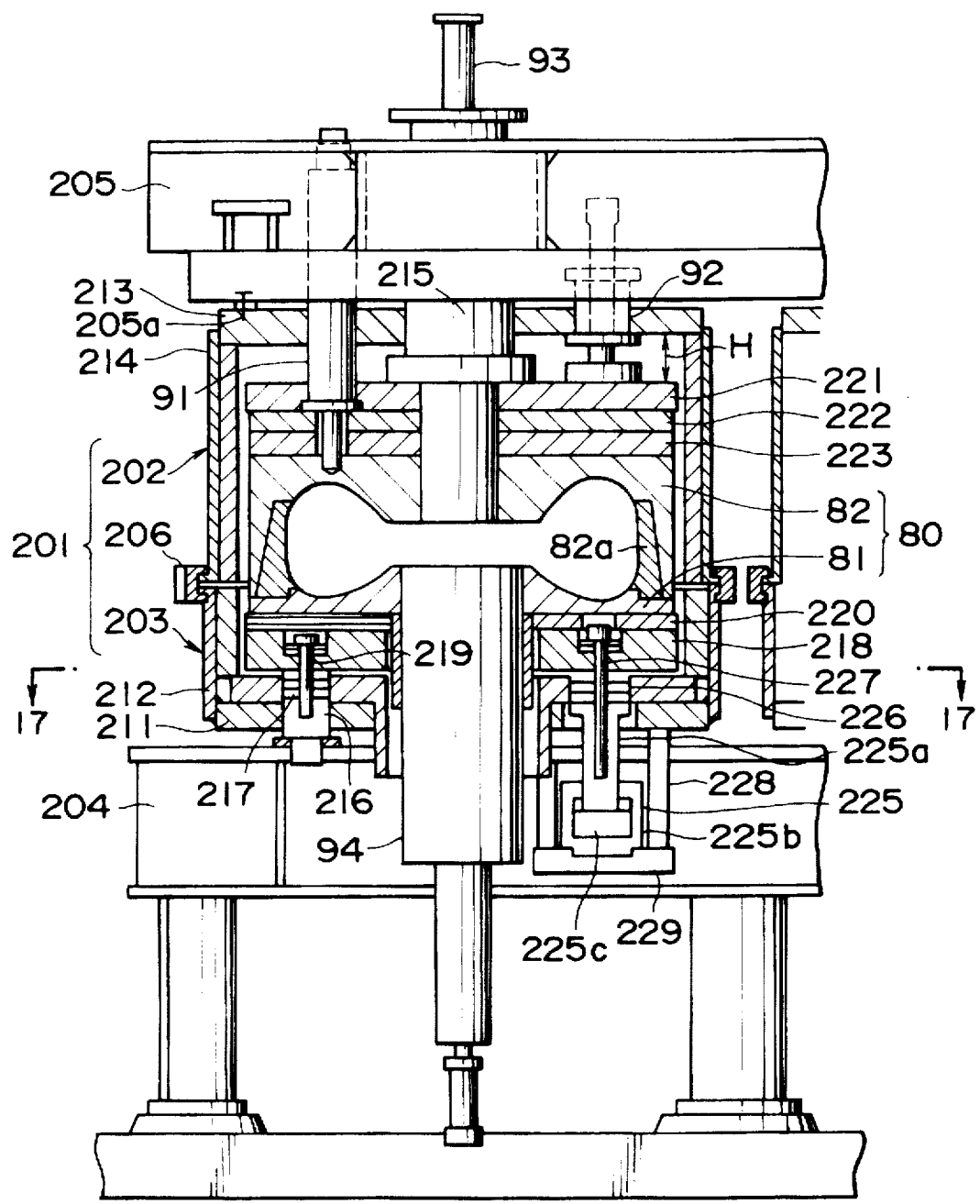
FIG. 16 is a sectional view for showing a substantial part of the tire vulcanizing press.

In FIG. 16, the mold unit 201 is set such that the upper dome 202 and the lower dome 203 are engaged with or disengaged from each other by the lock device 206 acting as an engaging or disengaging means. In particular, the upper dome 202 is of a structure in which it is fixed to the lower side of the upper link 205 with bolts 205a, wherein the upper link 205 and the upper dome 202 constitute the upper press member and in turn the press space 204 and the lower dome 203 constitute the lower press member. Although this structure is similar to that disclosed in the gazette of Jap. Pat. Publn. No. Hei 1-24050, it will be described in brief as follows.

The lower dome 203 is formed by a horizontal table 211 and a cylindrical wall 212 around the horizontal table 211, and the upper dome 202 is formed by the horizontal plate 213 and the cylindrical wall 214 around the horizontal plate 213. The upper dome 202 is fixed to the upper link 205, and the lower dome 203 is supported by supporting rods 216 vertically installed from the press space 204 in such a way that the lower dome may be slid in a vertical direction.

A lower platen support 218 is fixed on the supporting rods 216 with bolts 219 through a thermal insulation member 217, wherein a lower platen 220 acting as a heating plate is overlapped on the lower platen support 218 through the thermal insulating plate and the lower mold 81 is fixed onto the platen 220 through the lower mold engaging or disengaging device.

The horizontal plate 213 of the upper dome 203 is provided with a hollow cylinder 215 in such a way that it may be slid in a vertical direction and a horizontal plate 221 is fixed to the lower part of the hollow cylinder 215. The upper mold 82 is fixed at a further lower part of the horizontal plate 221 by the upper mold engaging or disengaging device 91 through the upper platen support 222, the thermal insulating member not illustrated and the upper platen 223. In addition, the horizontal plate 221 is supported in respect to the horizontal plate 213 through the mold height adjusting device 92, and a space H between both horizontal plates 221, 213 can be adjusted in response to a variation in thickness of the mold 80.

In addition, the central mechanism 94 is arranged below the central position of the lower mold 81. The central mechanism 94 holds a plug which can be deformed and set along the inner surface of the green tire in such a way that it may be extended or retracted as well known in the art and at the same time steam acting as a source of pressurizing and heating operation can be fed into the plug. As a method for inserting the plug into the green tire, there is a post-in-well type or a standing-post type insertion. In addition, the split mold operating device 93 for extending or retracting to move the mold piece 82a is installed above the central position of the upper mold 82.

In addition, there is provided a hydraulic cylinder 25 acting as fastening means to act between the lower platen support 218 and the horizontal plate 211 of the lower dome 203. The extremity end of the piston rod 225a of the hydraulic cylinder 225 is fixed to the lower platen support 218 by bolts 227 through the thermal insulating plate 226, and the main body 225b of the hydraulic cylinder 225 is fixed to a base plate 229 at the extremity end of the extending member 228. As the piston 225c of the hydraulic cylinder 225 is extended, the lower dome 203 is depressed down and the upper and lower molds 80 are fastened through the lock device 206 acting as the engaging or disengaging means, the upper dome 202 and the mold height adjusting device 92.

Figure 18:
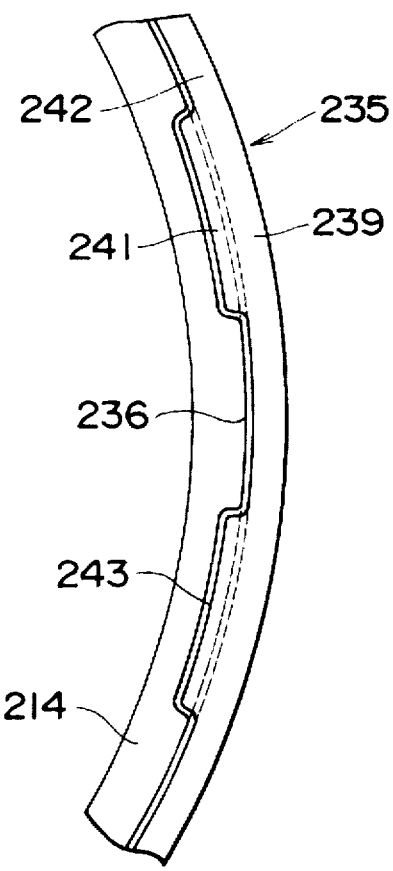
FIG. 18 is a top plan view for showing a substantial part of the lock device.
Figure 19:
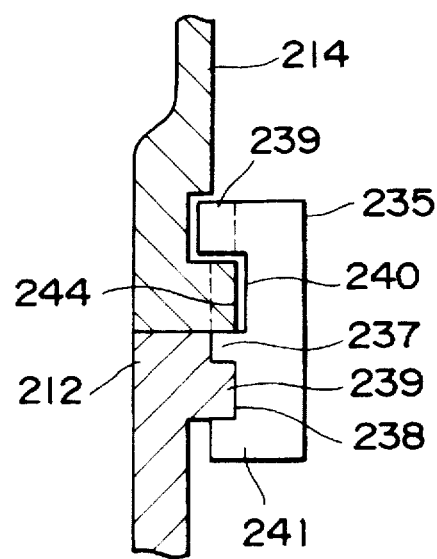
FIG. 19 is a sectional view taken along a line D—D of FIG. 17.

Referring now to FIGS. 17 to 19, the lock device 205 acting as the engaging or disengaging means for the upper and lower domes 203, 203 will be described below. FIG. 17 is a sectional view taken along a line C—C of FIG. 16. FIG. 18 is a top plan view for showing a substantial part of the lock device and FIG. 19 is a sectional view taken along a line D—D of FIG. 17.

The inner surface of the lock ring 235 is formed with a groove 238 extending along a circumferential direction of the inner surface by the lower edge 241 projected inwardly at its lower-most end and an engaging edge 237 projected similarly inwardly at its upper stage, wherein the groove 238 is rotatably fitted to a fitting projection 239 projected outwardly at the outer circumferential surface near the upper end of the wall 212 in the lower dome 203 and then supported at the lower dome 203. An engaging groove 240 extending similarly along the circumferential direction of the inner surface is formed between the aforesaid engaging groove 237 and the upper edge 239 and at the same time teeth 241 and recesses 242 are alternatively cut inwardly at the inner surface of the upper edge 239 as shown in FIG. 18. To the contrary, the lower end of the wall 214 at the upper dome 202 is provided with teeth 244 arranged alternatively to be faced outwardly which can be engaged with the recesses 243 capable of passing through the teeth 241 of the aforesaid ring 235 at its outer circumferential surface and the teeth 241 capable of passing through the recesses 242 at the aforesaid ring side. In order to perform a reverse rotation of the lock ring 235, as shown in FIG. 17, a rotating member 245 such as a rotating cylinder or the like is fixed to the wall 212 of the lower dome 203.

The rod 245a is connected to the lock ring 235, thereby the teeth 241 at the ring side 235 as shown in FIG. 18 are just oppositely faced against the recesses 243 at the wall 214 of the upper dome 202 vertically descended, the recesses 242 at the ring 235 are oppositely faced against the teeth 244 at the wall 212 of the lower dome 203, thereby the lower end of the wall 212 descends into the engaging groove 240 of the ring 235 as it is as shown in FIG. 19 and then the lock ring 235 is rotated by the operating rod 245a of the rotating member 245, the teeth 241 at the ring 235 are overlapped on the teeth 244 at the wall 212 so as to perform the locking operation.

The present invention is not limited to the dome lock type in which the upper dome 202 of the part of the upper press member and the lower dome 203 of the part of the lower press member can be engaged with or disengaged from each other by the lock device 206, but may be of a column lock type in which the upper press member having four columns suspended down is applied in place of the upper dome, and the lower press member and the extremity ends of the columns are provided with the lock device. In addition, the lock device 206 acting as the engaging or disengaging means is not limited to the aforesaid type, either, and it may be of a type using claws similar to those shown in FIG. 7.

Figure 20:
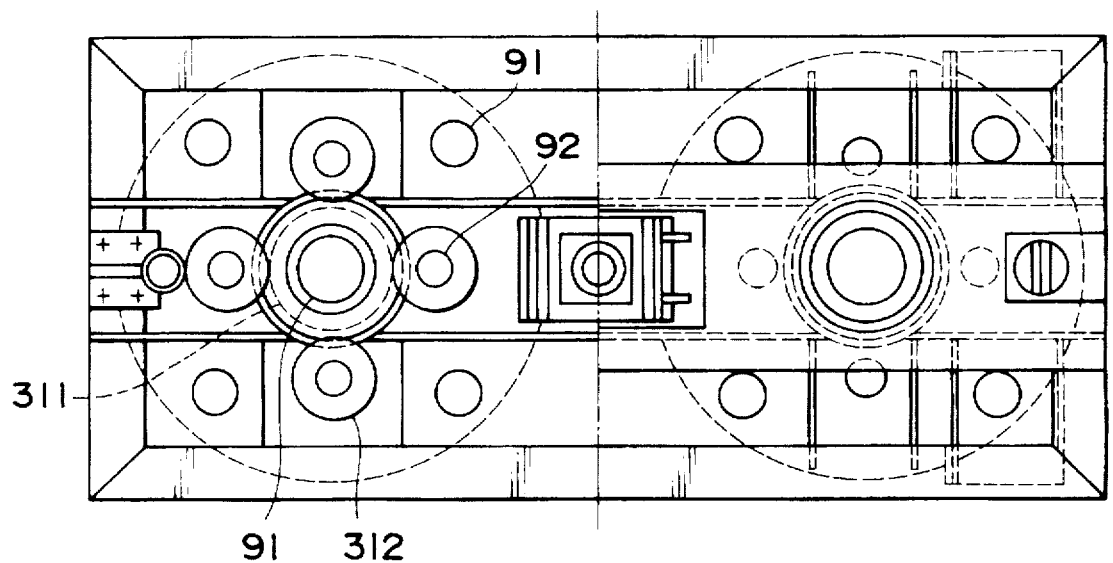
FIG. 20 is a sectional view taken along a line B—B of FIG. 3 for showing an arrangement relation of each of the devices arranged at the upper press member.

FIG. 20 is a sectional view taken along a line B—B of FIG. 3, wherein there is shown an arranging relation of an upper mold engaging or disengaging device 91 arranged on the upper ring 205 acting as a part of the upper press member, the mold height adjusting device 92 and the split-mold operating device 93.

In FIG. 20, the center of each of the molds is provided with the split mold operating device 93. If a line connecting the two molds from each other is defined as 0°, the mold height adjusting devices 92 are arranged on the concentric circle with angles of 0°, 90°, 180° and 270° and the upper mold engaging or disengaging devices 91 are arranged on the concentric circle with angles of 45°, 135°, 225° and 315°. In particular, the four mold height adjusting devices 92 are totally rotated synchronously by four small gears 312 engaged with a common gear 311 rotatably and freely fitted to the mold center. However, the tire vulcanizing press is not provided with a driving device for the small gears 312 and installed at the manipulator side described later as the second driving device. Similarly, the third driving device for the split mold operating device 93 and the first driving device for the upper mold engaging or disengaging device 91 are also installed at the manipulator.

Figure 21:
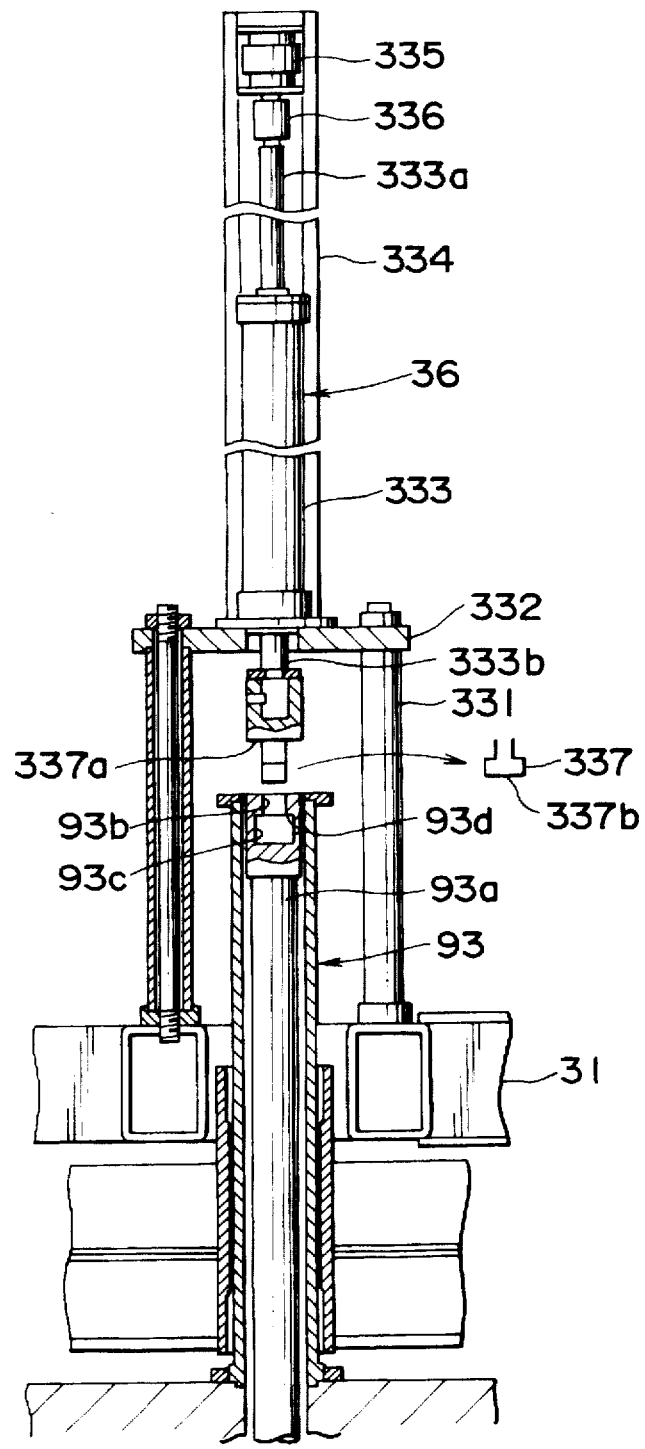
FIG. 21 is a side elevational view for showing a third driving device connected to a split mold operating device.

FIG. 21 is a side elevational view for showing the third driving device 36 connected to the split mold operating device 93. The third driving device 36 is comprised of both rod-type liquid pressure cylinders 333 vertically installed at a base plate 332 fixed to the upper end of the rod 331 vertically mounted on the slide 31, and a rotary actuator 335 fixed to the fixing plate 334 vertically mounted from the base plate 332. The upper rod 333a of the liquid pressure cylinder 333 is connected to the rotary actuator 335 through the coupling 336 and then the T-shaped fitting 337 is fixed to the lower end of the lower rod 333b.

A rectangular hole 93b having the T-shaped fitting 337 entered therein and a hole 93c with an orthogonal line of the rectangular hole 93b being applied as a diameter are continuously arranged at the extremity end of the lifting-up or descending rod 93a of the split-mold operating device 93. As the slide 31 of the manipulator stops at the predetermined position, the lower side rod 333b of the air cylinder 333 extends, the stepped part 337a of the fitting 337 is abutted against the upper end of the lifting-up or descending rod 93a. Under this state, the extremity end 337b of the T-shaped fitting 337 passes through the rectangular hole 93b and is positioned in the hole 93c. Then, as the rotary actuator 335 is rotated by 90°, the extremity end 337b of the T-shaped fitting 337 is engaged with a stepped part 93d and then a connection between the third driving device 36 and the split-mold operating device 93 is completed. Then, the lower side rod 333b of the air cylinder 333 is further lifted up or descends, the lifting-up or descending rod 93a is also lifted up or descends to open or close the split-mold. In addition, the rotation of the rotary actuator is transmitted to the lifting-up or descending rod 93a and the lifting-up or descending rod 93a and the split-mold may also be engaged or disengaged.

In addition, accuracy in which the T-shaped fitting 337 passes through the rectangular hole 93b may be allowed to have a displacement of mm unit and so a simple position setting device 34 as shown in FIG. 8 is satisfactory.

Figure 22:
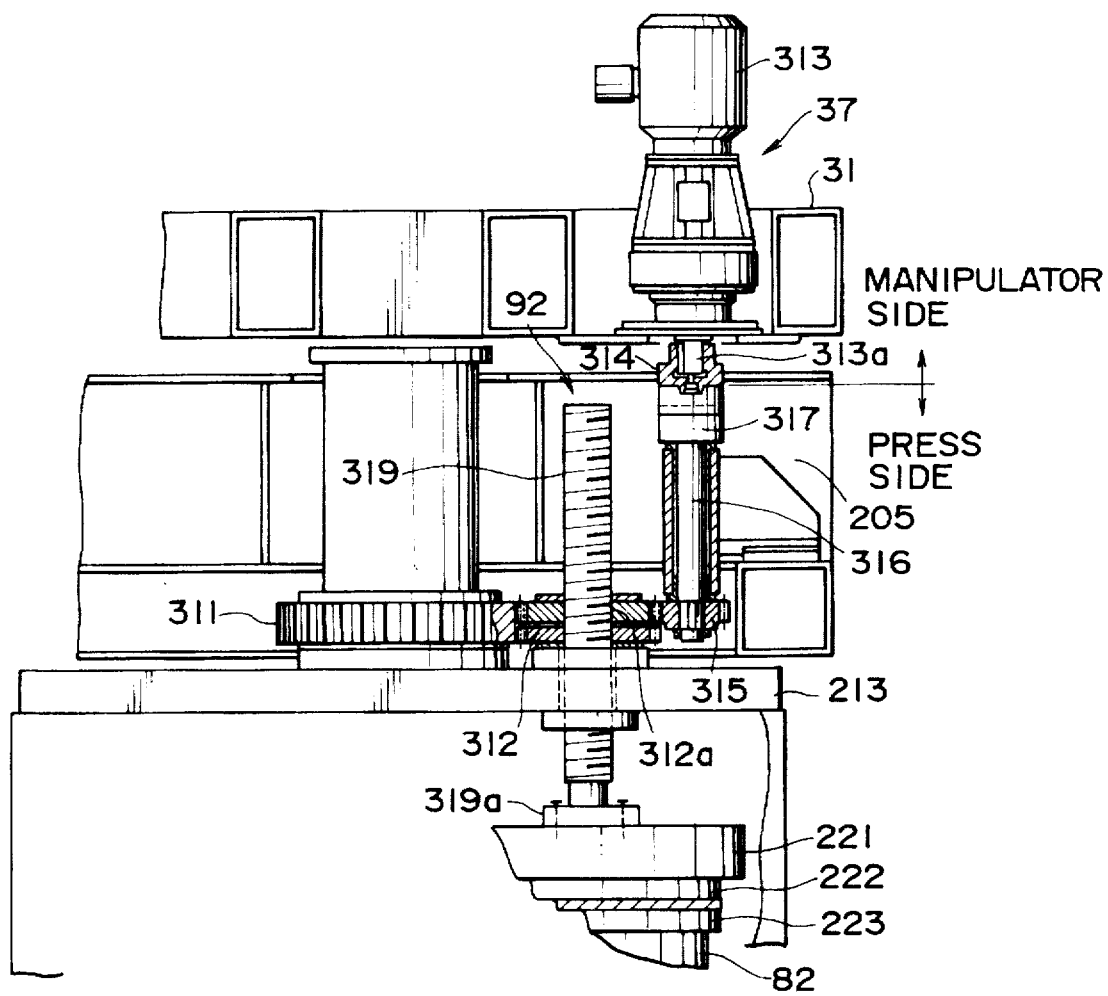
FIG. 22 is a front elevational view for showing a second driving device connected to a mold height adjusting device.
Figure 22A:
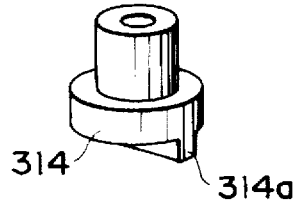
Figure 22B:
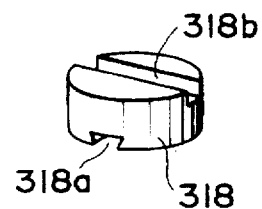
Figure 22C:
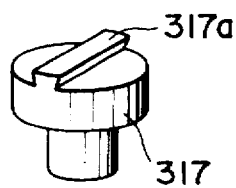

FIG. 22 is a front elevational view for showing the second driving device connected to the mold height adjusting device 92. The second driving device 37 is constructed such that the coupling piece 314 is fitted to the extremity end of the driving shaft 313a of the motor 313 fixed downwardly to the slider 31 at the manipulator. The link 205 at thetire vulcanizing press is constructed such that the driving gear 315 engaged with one side of the small gear 312 described in reference to FIG. 20 is fitted to the lower end of the vertical shaft 316, the vertical shaft 316 is rotatably supported at the link 205 and the coupling piece 317 is fitted to the upper end of the vertical shaft 316. As shown in perspective views of FIGS. 22(a), (b) and (c), the coupling piece 317 is machined to have a diverging projection 317a, and an intermediate coupling 318 having a diverging groove 318a sliding along the diverging projection 317a is fitted to the coupling piece 317. Then, a projection 314a of the coupling piece 314 at the manipulator is engaged with a concave groove 318b of the intermediate coupling 313. As the slide 31 of the manipulator stops at the desired position, the projection 314a of the coupling piece 314 at the manipulator is engaged with the concave groove 318b of the intermediate coupling 318 at the tire vulcanizing press. Under this engaged state, there is a possibility that the center of the driving shaft 313a of the motor 313 is displaced from the center of the vertical shaft 316 at the manipulator by a unit of mm. In this case, the diverging groove 318a of the intermediate coupling 318 and the diverging projection 317a of the coupling piece 317 slide to accommodate for the displacement between the centers and there is no trouble in transmitting a rotational force of the motor 313. In addition, the projection 314a of the coupling 314 of the motor 313 is already adjusted to face against a running direction of the manipulator.

Then, in FIG. 20, as one small gear 312 is rotated, the four small gears 312 are synchronously rotated through the intermediate gear 311. Returning back to FIG. 22, an inside part of the small gear 312 rotatably held at the horizontal plate 213 of the upper dome is machined with a female thread 312a, and a screw rod 319 engaged with the female thread 312a is lifted up or descends as the small gear 312 is rotated. The lower end flange 319a of the screw rod 319 is fixed to the horizontal plate 221 with bolts or the like, the lower mold 82 is lifted up or descends so as to adjust the mold height. Operation of this second driving device 37 corresponds to the case in which the mold is to be replaced as described later.

Figure 23:
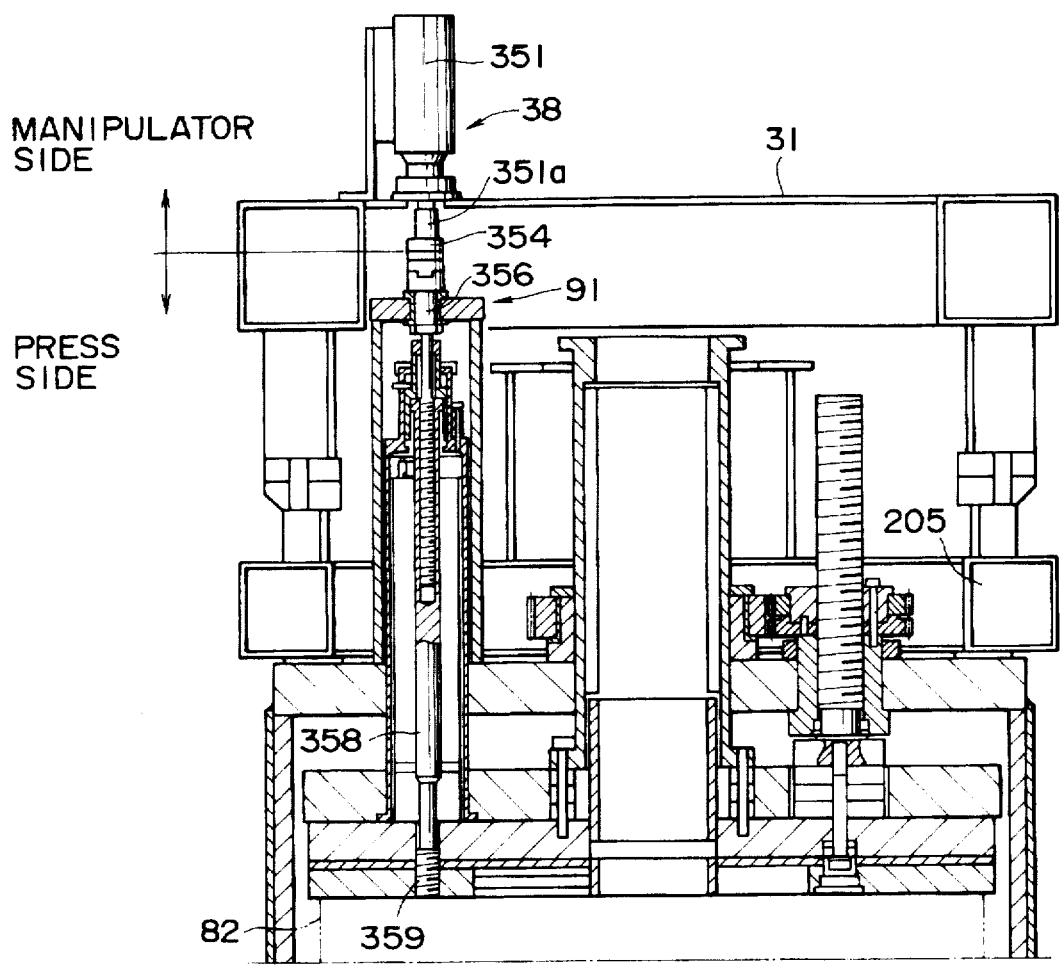
FIG. 23 is a front elevational view for showing a first driving device connected to the upper mold engaging or disengaging device.
Figure 23A:
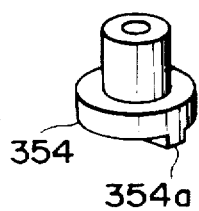
Figure 23B:
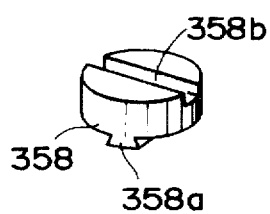
Figure 23C:
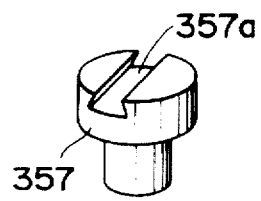

FIG. 23 is a front elevational view for showing the first driving device 38 to be connected to the upper mold engaging or disengaging device 91. The first driving device 38 is constructed such that the coupling piece 354 is fitted to the extremity end of the driving shaft 351a of the motor 351 fixed to face downward at the slider 31 at the manipulator. The driving shaft 356 is rotatably supported at the link 205 at the tire vulcanizing press and the coupling piece 357 is fitted to the upper end of the driving sahft 356. As shown in the perspective views of FIGS. 23(a), (b) and (c), the coupling piece 357 is machined to have the diverging projection 357a and the intermediate coupling 358 having the diverging groove 358a slid along the diverging projection 357a. Then, the projection 354a of the coupling piece 354 at the manipulator is engaged with the concave groove 358b of the intermediate coupling 358.

When the slide 31 of the manipulator stops at the predetermined position, the projection 354a of the coupling piece 354 at the manipulator is engaged with the concave groove 358b of the intermediate coupling 358 at the tire vulcanizing press. Under this engaged state, there is sometimes a possibility that the center of the driving shaft 351a of the motor 351 is displaced from the center of the driving shaft 356 at the manipulator by a unit of mm. In this case, the diverging groove 358a of the intermediate coupling 358 and the diverging projection 357a of the coupling piece 357 slide to accommodate for the displacement of the centers and there is no trouble in transmitting the rotational force of the motor 351. In addition, the projection 354a of the coupling 354 of the motor 351 is adjust to face against the running direction of the manipulator.

Then, the clamp bolt 358 fitted in such a way that it may be freely slid in a vertical direction in respect to the driving shaft 356 is rotated, the fixing of it with the upper mold 82 is automatically set to be engaged or disengaged. Operation of the first driving device 38 is carried out in the case that the mold is to be replaced as described later. The old mold, in particular, the upper mold 82 is automatically engaged or disengaged. Then, the new upper mold 82 is fixed. A mold height adjustment is carried out by the aforesaid mold height adjusting device 92.

Figure 24:
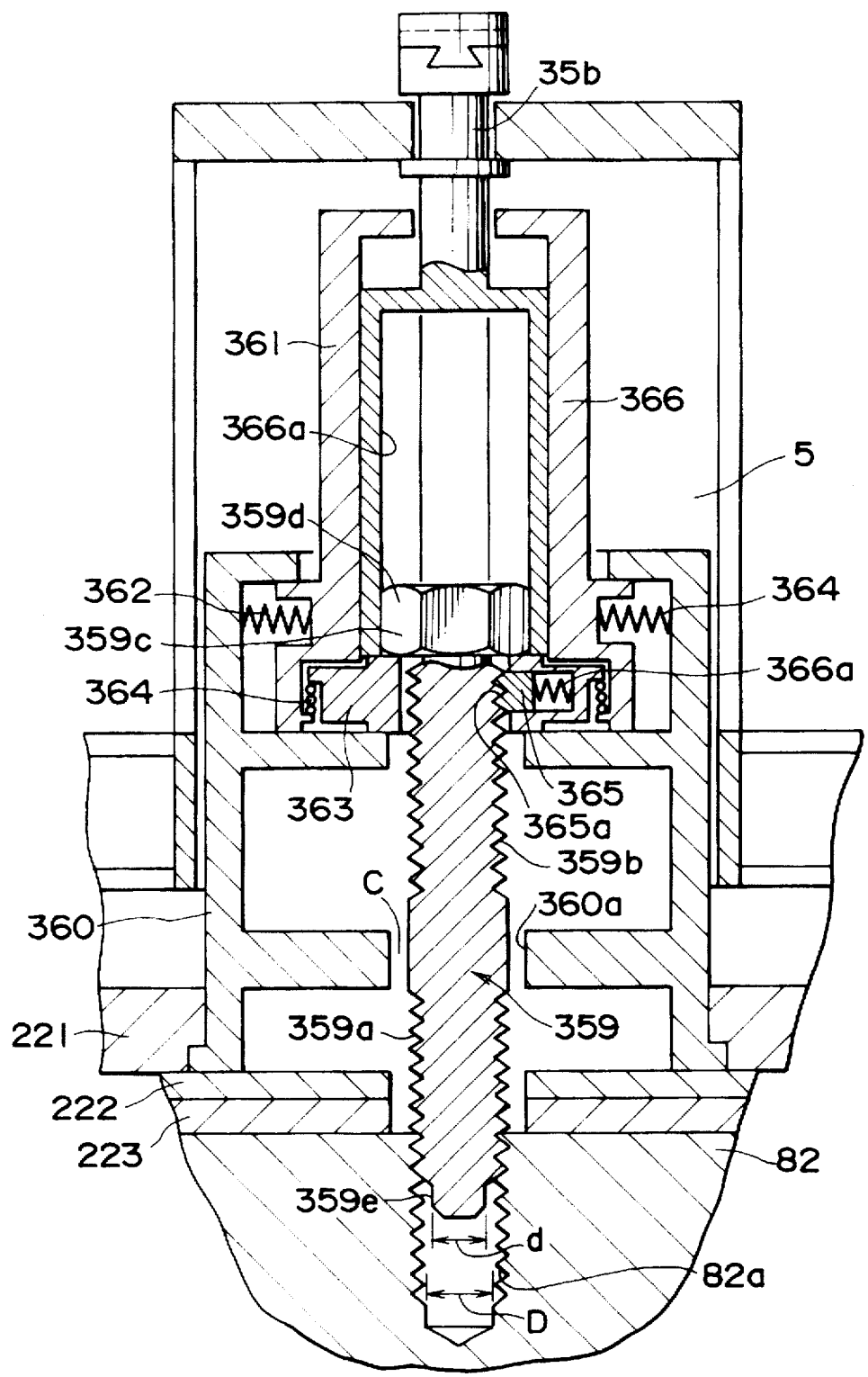
FIG. 24 is a sectional view for showing a schematic configuration of the upper mold engaging or disengaging device.

Then, referring now to FIG. 24, a schematic configuration of the upper mold engaging or disengaging device 91 will be described. The first cylindrical housing 360 extending in an upward direction is fitted to the horizontal plate 221 of the upper dome, the second cylindrical housing 361 is unrotationally and slidably supported in a horizontal orientation within the first cylindrical housing 360 and resiliently pushed toward the center with a plurality of springs 362. These plurality of springs 362 constitute a part of a center displacement allowing mechanism. In addition, a pressing ring 363 is inserted into the lower part of the aforesaid first housing 361 in such a way that it may not be rotated and the pressing ring 363 is resiliently pushed upwardly by a spring 364.

The upper mold 82 is arranged at the lower surface of the aforesaid horizontal plate 221 through the upper platen support 222 and the upper platen 23. A clamp rod 359 is arranged toward the clamping female screw 82a formed at the upper mold 82. The lifting-up or descending female screw member 365 is supported within the aforesaid pressing ring 363 in such a way that it may be freely moved in a radial direction, and the female screw member 365 is resiliently pressed by the spring 366a in a radial inward direction. The aforesaid female screw member 365 is formed with the lifting-up or descending female screw 365a.

The clamp rod 359 is inserted into the ring 363 and further inserted into the through-pass hole 360a of the first housing 360 while the centering space C being spaced apart. The first male screw 359a, the second male screw 359b, the pressing part 359c and a rotated part 359d are arranged at the clamp rod 359 in this order from the lower part of it. The extremity end of the first male screw 359a is provided with a lead part 359a which is narrowed at its end. An outer diameter (d) of the lead part 359e is set to be smaller than an inner diameter D of the male screw 82a. In addition, the second male screw 359b is threadbly engaged with the lifting-up or descending female screw 365a of the lifting-up or descending female screw member 365.

A socket 366 is installed inside the second housing 361 and the upper end of the socket 366 becomes the driving shaft 356. The rotated part 359a is engaged with a hexagonal hole 366a formed inside the socket 366 in such a way that it may transmit its rotation and it may be lifted-up or descend.

Under the clamped state shown in the figure, the socket 366 is rotated in a clockwise direction as viewed in its top plan view, and the upper mold 82 is pulled up through the rod 359 by a thread engaging force between the first male screw 359a of the clamp rod 359 and the clamping female screw 82a, and the downward-directed reaction force acting against the rod 359 is received by the upper surface of the upper platen support 222 through the pressing part 359c and the pressing ring 363 in sequence. With such an arrangement as above, the upper mold 82 is fixed to the upper dome.

Application of the aforesaid upper mold engaging or disengaging device 91 causes the upper mold 82 to be removed away from the upper platen 223 and then single unit of upper and lower molds is left on the lower platen 220 shown in FIG. 16. Accordingly, if the fixed state between the lower mold and the lower press member is released by the lower mold engaging or disengaging device, the single unit of upper and lower molds can be removed at each of the tire vulcanizing press.

A schematic configuration of the lower mold engaging or disengaging device 94 and the mold replacing boggie 95 will be described in reference to the perspective view of FIG. 25. The lower mold engaging or disengaging device 94 is comprised of a centering means 402 for position setting the upper and lower molds 80 in respect to the lower mold transporting and mounting means 401 and the lower platen 220; lifting-up or descending means 403 which can be lifted up or descend in respect to the lower press member; and clap means represented by clamp claws 404 which are position set and removabnly attaching the lower mold 81 mounted on the lower platen 220 against the lower platen 220 through the lifting-up or descending means 403.

The mold replacing boggie 95 is comprised of a boggie 405 which can wait in front of the tire vulcanizing press and have a mounting part capable of mounting the upper and lower molds 80 under a specified horizontal state; and a pair of guiding members 406 arranged at both sides of the lower platen 220 and having supporting parts within the same horizontal plane as that of the mounting part of the boggie 405, and the boggie 405 is provided with a lifter 406 which is lifted-up or descends.

In the illustrated example, the upper and lower molds 80 are held in a horizontal attitude at the mounting part of the boggie 405 through the mold plate 407. The mold plate 407 is made such that the mold fixing part is formed in a circle as viewed in a top plan view, parallel sides 408 are projected outwardly in a rightward or leftward direction at both sides, reference holes not illustrated acting as the centering means 402 are formed and at the same time the front lower surface of it is formed with a key-way not illustrated to be fitted into a key 409 of the lower platen 220.

A pair of guide members 406 constituting a mold transporting and mounting means together with the mounting part of the boggie 405 are fixed to the tables 410 on the press base of both right and left sides of the lower platen 220, a row of balls 411 acting as rolling members are arranged on the upper surfaces of the tables 410 through the lifting-up or descending means 403 and they slide the parallel sides 408 in the mold plates 407 on the horizontal plane through rotation of the balls 411.

At the inlet sides of the guide members 406, the guide members 412 for use in delivering the upper and lower molds 80 are fixed on the tables 410, a row of rotatable balls 413 are arranged on the upper surfaces of the guide members 412. There are provided guides 414 fixed in diverged shape as viewed from top plan at the upper outside part, the parallel sides 403 at the mold plate 407 can be fitted into the guide member 406 which can be lifted up or descend while they are being centered. A stopper 415 is arranged at the deep part of the guide member 406. The guide 414 and the stopper 415 constitute the centering means for use in position setting the upper and lower molds 80 against the lower platen 220.

The lifting-up or descending means 403 is comprised of a fluid cylinder 416 arranged between the guide member 401 and the table 410, and of the vertical guides 417 installed at the front part and the rear part of it. The fluid cylinder 416 is fixed to the table 410 and connected to the guide member 406, and in turn, the vertical guides 417 have rods 410a fixed to the table 410 and fitted through bushings. In this way, the guide members 406 are lifted up or descend together with clamp claws 404 through guiding of the vertical guides 417 under extension or retraction of the fluid cylinder 416. The lower mold 81 is removably attached to the lower platen 220 through the parallel part 408 at the mold plate 407.

At the front surface of the tire vulcanizing press 1, the mold plate 407 having the upper and lower molds 80 fixed thereto can wait by the mold replacing boggie 95. The replacing boggie 95 is provided with the lifter 406. The replacing boggie 95 has a hook part 418 for the mold plate 407 and then a snake-chain 420 can be fed out by the driving part 419.

Description of the structure of each of the devices installed at the tire vulcanizing press is finished now and the vulcanizing cycles of the aforesaid tire vulcanizing system will be described.

In FIG. 1, it is assumed that the manipulator 2 of No. 1 is started to operate the tire vulcanizing press 1 of No. 5. At this time, it is assumed that some data such as the fact that a next tire vulcanizing press 1 finishing the vulcanizing time is No. 5 and various dimensions of tire to be vulcanized by the tire vulcanizing press 1 of No. 5 are inputted to the manipulator control part 10 for the manipulator 2 of No. 1. Then, the manipulator 2 of No. 1 runs toward the tire vulcanizing press 1 of No. 5. The manipulator 2 runs at a high speed until it detects a limit switch, a near switch and other sensors installed before and after the tire vulcanizing press 1 of No. 5, and upon detection of the limit switch or the like, the manipulator runs slow and stops before the tire vulcanizing press 1 of No. 5. At this time, the holding plates 66, 66 of the position setting means 34 shown in FIG. 8 are rotated from the two-dotted line positions to the solid line positions hold a rectangular block 61 and its accuracy in stopping position is less than several mil-meters.

Then, the opening or closing cylinder 30 shown in FIG. 3 is extended, thereby the slide 31 descends under an action of an adjusting bar 45 of FIG. 5 while its degree of horizontal state being kept. The slide 31 descends toward the link 205 of the tire vulcanizing press 1, the pin 51 is inserted into the guide hole 59a of the receiving plate 59 shown in FIG. 5 and abutted against the horizontal abutting plate 52. The hydraulic cylinder 57 in the connector means 35 in FIG. 5 is extended to cause the claws 55 to oscillate from the two-dotted line position to the solid line position, the slant surface 59b is abutted against the slant part 55a, and the slide 31 at the manipulator 2 is connected to the link 205 at the tire vulcanizing press 1.

The lock device 206 acting as the engaging or disengaging means in FIG. 16 is operated to remove the upper dome 202 and the lower dome 203 from each other. More practically, the lock ring 235 in FIG. 17 is rotated, the teeth 241 in FIG. 18 are oppositely faced against the recesses 243, the upper dome 202 is moved away from the lower dome 203 and then it can be lifted up. Then, as shown in FIG. 3, the opening or closing cylinder 30 is retracted to its stroke end, thereby the slide 31 lifts up concurrently the two upper molds together with the link 205, resulting in that the press, i.e. the molds are opened as shown in the figure.

In the case that the mold is of a split-type mold, the air cylinder 333 in FIG. 21 is extended and when the T-shaped fitting 337 at the extremity end thereof enters the hole 93c of the lifting-up or descending rod 93, the rotary actuator 335 is rotated by 90°. Then, the air cylinder 333 is connected to the lifting-up or descending rod 93. After this operation, the air cylinder 333 is extended or retracted and the split-mold operation in which the segments of the split-mold are extended or retracted in a direction of diameter is carried out.

Then, the vulcanized tire is transported by the unloader 33, and the green tire is fed in by the loader 32. At this time, a transporting accuracy of the post-cure inflator toward the rim center under an operation of the unloader 33 and an accuracy of transportation to the press center under an operation of the loader 32 may substantially influence on a balanced state of the tire. Due to this fact, the unloader 33 and the loader 32 can perform a high accurate transporation.

Figure 26:
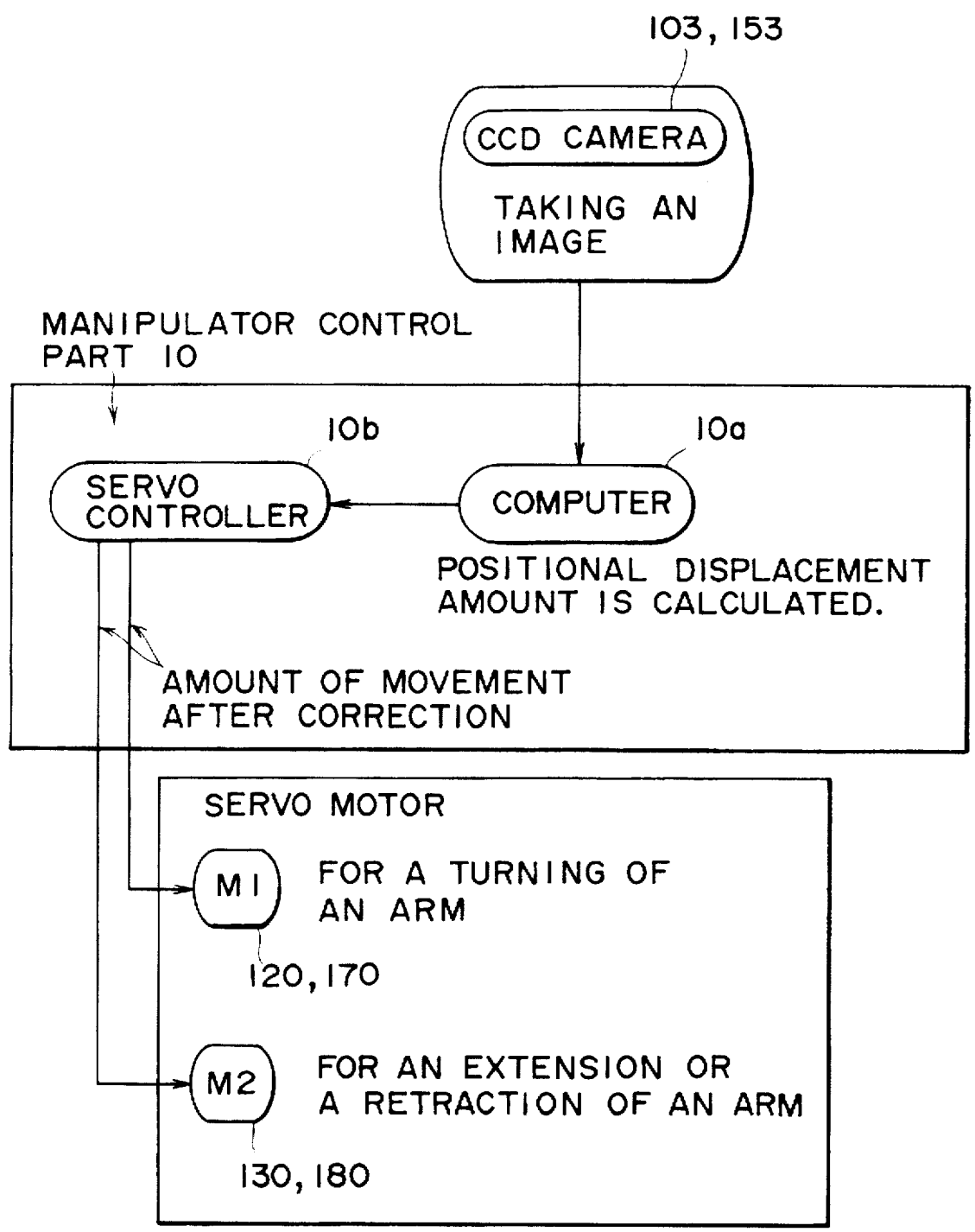
FIG. 26 is a block diagram for showing a centering correction means in the unloader and the loader, respectively.

That is, as shown in the block diagram of FIG. 26, a predetermined reference position is photographed by the visual sensors 103, 153 (practically, these are CCD cameras) and its image is processed, a positional displacement is calculated by the computer 10a within the manipulator control part 10 and then a centering correction value accommodating for the positional displacement is outputted to the servo controller 10b. The servo controller 10b outputs a moving amount after centering correction against the arm turning servo motors (M1) 120, 170 and the arm extending or retracting servo motors (M2) 130, 180.

Figure 27:
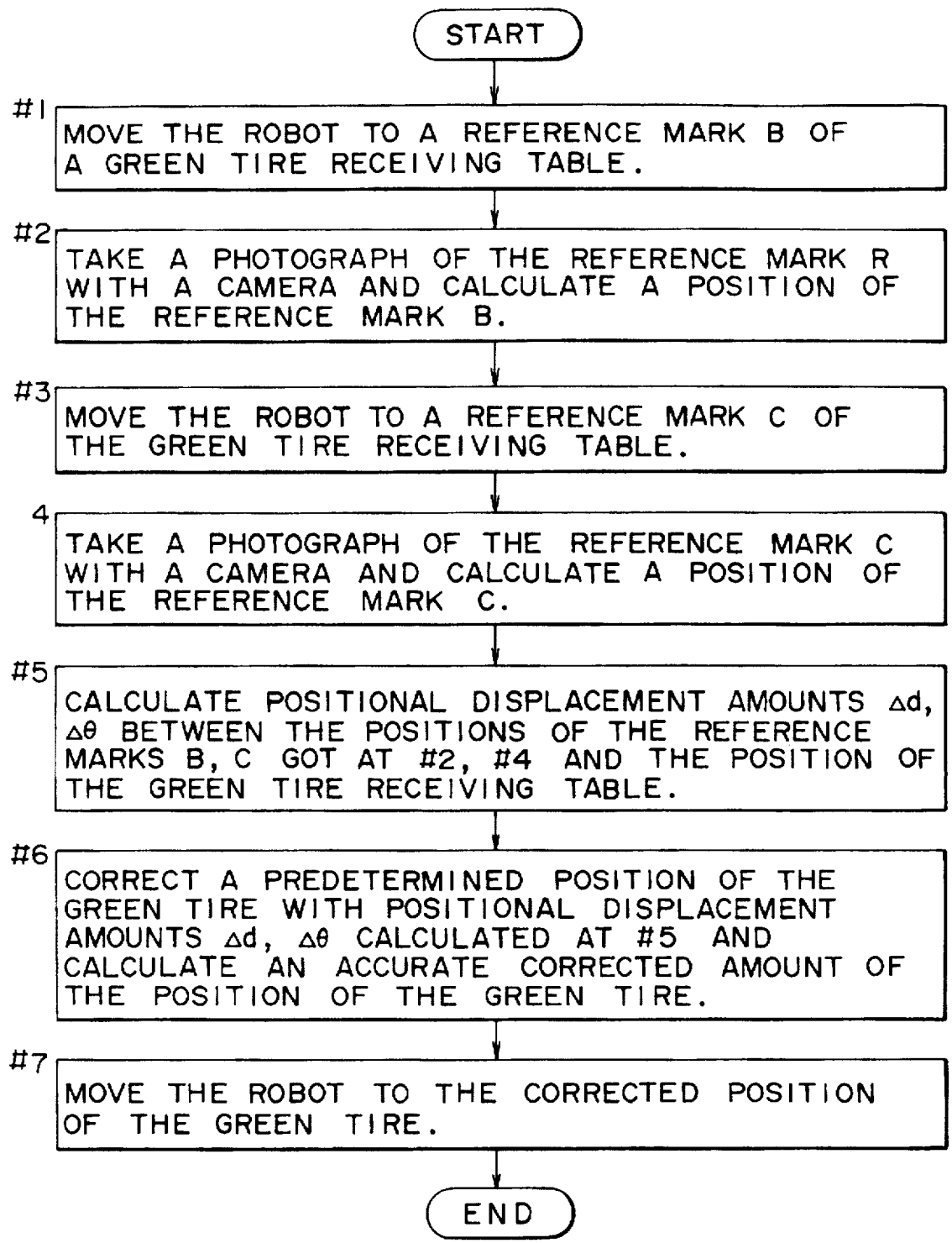
FIG. 27 is a flow-chart of the centering correction means in the unloader.

Since it is quite important to perform correction of the unloader 33 and the rim center as well as correction of the loader 32 and the press center, this correcting procedure will be described in reference to the flow-chart of FIG. 27 and the top plan view of FIG. 9. In FIG. 9, the unloader 33 is turned and moved along a locus of ③ and the loader 32 is turned and rotated along a locus of ① (a step No. 1). Then, the CCD cameras 153, 103 acting as visual sensors arranged at the unloader 33 and the loader 32 take photographs of the reference mark E and the reference mark A and then positions of the actual reference marks E and A are calculated (a step No. 2). Since they are the rim center 04 or the press center 03 of the preset post-cure inflator (PCI) or the reference marks E and A related to the centers, a positional displacement amount can be calculated as Δd in reference to a difference between an original position and a practical position (a step No. 3).

The position of the rim center 04 of the accurate post-cure inflator (PCI) or the position of the press center 03 as viewed from the unloader of the stopped manipulator is calculated in reference to this positional displacement amount Δd so as to determine the arm turning amount and extending or retracting amount of the unloader and the loader (a step No. 4). Then, the chucks of the unloader 33 and the loader 32 are moved to the position of the rim center 04 and the position of the press center 03 of the accurate post-cure inflator (PCI) in response to the corrected turning amount and extending or retracting amount of arm (a step No. 5). Since the opening or closing and upward or downward movement of the chucks 151 and 101 are different in view of the mold size or the tire size, they are inputted in advance from the concentrated monitoring computer to each of the manipulator controls. In addition, since the manipulator height direction and the press height direction are not changed a little ijn response to movement or stopping of the manipulator, it is satisfactory if they are controlled in such a way that they are controlled to cause the vertical positions inputted in advance by the computer and so it is not necessary to perform a correction.

Figure 28:
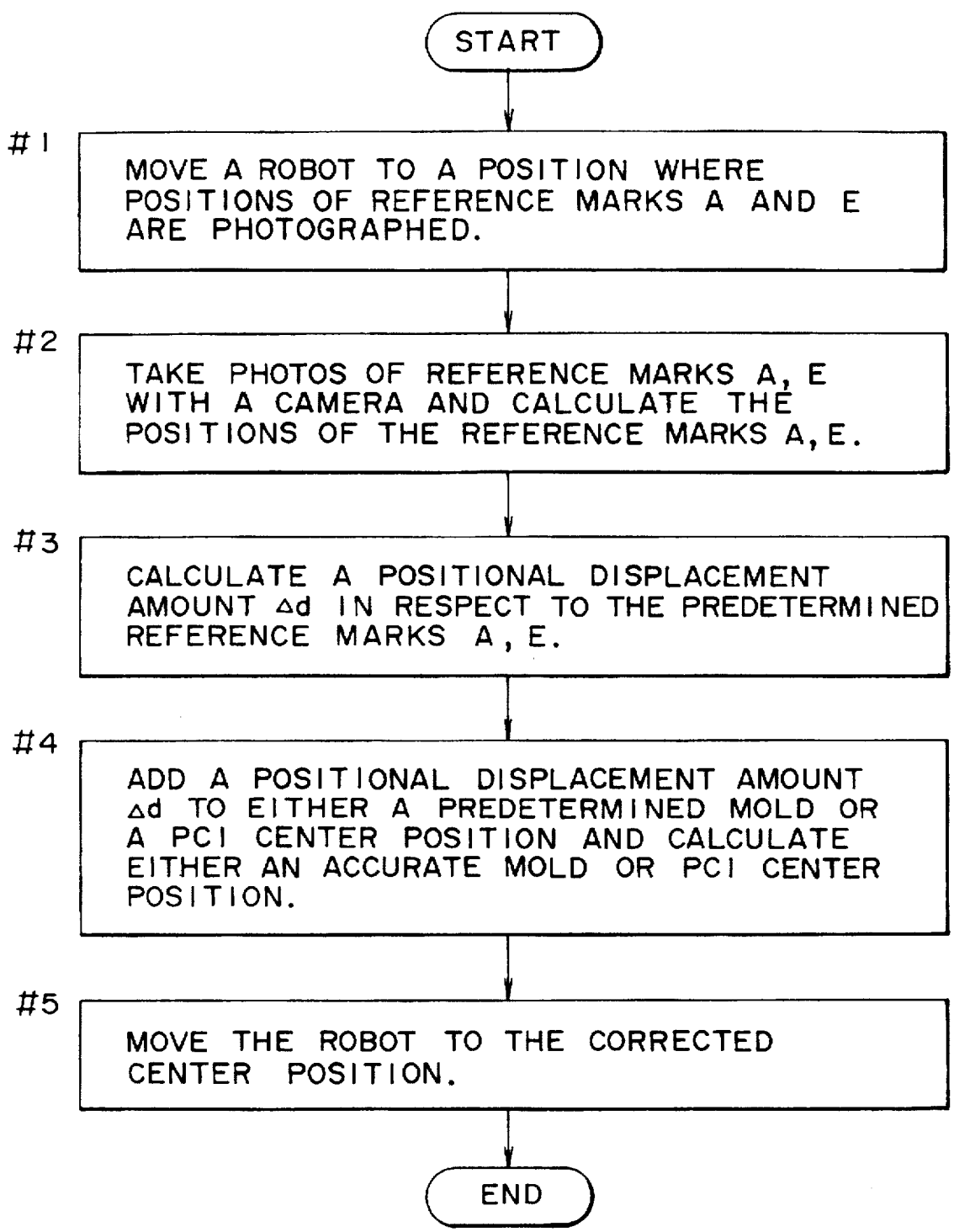
FIG. 28 is a flow-chart of the centering correction means in the loader.

In addition, since the green tire receiving table 7 shown in FIG. 9 is merely mounted on a floor by an automotive transporting vehicle, it is not placed by 90° in respect to a central line but inclined and at the same time it is widely displaced from its original position. In particular, it is normal that its displacement amount under application of the automotive transporting vehicle is ±50 mm or more. In view of this fact, the state in which the green tire receiving table 7 is mounted is confirmed in advance by the loader 32. The procedure for performing this operation will be described in reference to the flow chart of FIG. 28 and the top plan view of FIG. 9.

In FIG. 9, the loader 33 is turned and moved along a locus of ① and the loader 32 is turned and moved along a locus of ① and moves to the reference mark B (a step No. 1). Then, the CCD camera 103 acting as the visual sensor arranged at the loader 32 takes a photograph of the reference mark B (a step No. 2). Then, the loader 32 is turned and moved along a locus of ① and moves up to the reference mark C (a step No. 3). Then, the CCD camera 103 acting as the visual sensor arranged at the loader 32 takes a photograph of the reference mark C (a step No. 4).

Then, it is possible to calculate a positional displacement amount between the actual positions of the reference marks B, C got at the step Nos. 2 and 4 and the positions of the original reference marks B, C set by the green tire receiving table 7 to be mounted at the predetermined positions as Δd and Δθ (a step No. 5). A centering correction value in which the loader is moved to the position where the actual green tire is mounted in response to the positional displacement amounts Δd and Δθ is calculated (a step No. 6). The chucks of the loader 32 are moved to be positioned to the centers 01, 02 of the green tire in response to the corrected turning amount and extending or retracting amount of the arm (a step No. 7).

After completion of the centering correction, feeding-out of the vulcanized tire and feeding-in of the green tire are carried out. At first, under application of the unloader 33 of which centering is corrected, the bead of the vulcanized tire left at the press center 03 of the lower mold is held, pulled up and turned by the chucks 151, and reaches a point just above the rim center 04. Then, as the chucks 151 descend to open, the vulcanized tire is accurately mounted at the rim center 04.

Then, under an application of the loader 33 of which centering is corrected, a bead of the desired one of the two green tires on the green tire receiving table 7 is held, pulled up and turned by the chucks 101 and reaches a point just above the press center 03. Then, as the chucks 101 descend to open, the green tire is accurately mounted at the press center 03 and nstalled.

Then, as the green tire is installed at the press center 03, a so-called hold shaping is carried out in which the plug at the central mechanism is fed into the green tire while the green tire is being held by the chucks 101. The aforesaid preferred embodiment corresponds to the case in which the green tire is installed at the center of the lower mold, although there is another method in which the upper bead of the green tire is held by the upper mold and in the case of this method, the position of the reference mark A does not correspond to the press base 204 as shown in FIG. 9, but arranged at either a proper location of the upper dome 202 or the proper location of the parts accessoried in integral with the upper dome 202.

Upon completion of shaping of this green tire, the opening or closing cylinder 30 shown in FIG. 3 is extended, the slide 31 descends to cause the press to be closed in which the upper mold and lower molds are completely closed. Then, the lock device 206 acting as the engaging or disengaging means of FIG. 16 is operated to cause the upper and lower domes 202, 203 to be mechanically and integrally engaged to each other. Then, as the hydraulic cylinder 225 acting as the fastening means is extended, the upper and lower molds 202 and 203 are pushed down against the fixed platen support 218. Then, the fastening is carried out in such a way that the upper mold 82 is pushed against the lower mold 81 on the platen support 218 through the mold height adjusting device 92.

Then, after the lock device 206 causes the upper and lower domes 203, 203 to be engaged to each other, the connection between the tire vulcanizing press 1 and the manipulator 3 is released. That is, the connection between the link 205 at the tire vulcanizing press and the slide 31 at the manipulator through the connecting means 35 shown in FIG. 3 is released. Concurrently, as shown in FIG. 21, the connection between the split mold operating device 93 and the third driving device 36 is released. That is, the rotary actuator 335 is rotated by 90° to enable the T-shaped fitting 337 at the air cylinder 333 to pass through the rectangular hole 93b at the lifting-up or descending rod 93a, resulting in that the air cylinder 333 is retracted to cause the state shown in the figure to be attained.

After the released state of the aforesaid connecting means 35 and the split-mold operating device 93 is detected by the limit switch and the like, the lifting-up or descending cylinder 30 shown in FIG. 3 is retracted to cause the slide 31 to be lifted up to the upper limit position. Then, the holding plates 66, 66 in the position setting means 34 of the manipulator are opened and the position setting fixed state in respect to the rectangular block 61 is released. Before performing this releasing operation, the loader 32 and the unloader 33 shown in FIG. 9 are turned up to the retracted position in parallel with the lateral frame 24, and then the manipulator 2 starts to run toward the next tire vulcanizing press 1 after confirmation of the retracted position with the limit switch or the like. The aforesaid cycle is the normal vulcanizing cycle of the tire vulcanizing press 1 usig the manipulator 2.

Separate from such a vulcanizing cycle as one described above, if there is a modification of the tire size to be vulcanized or the like, the mold replacement is carried out. This mold replacement is also carried out under an assistance of the manipulator and so the procedure for replacing the mold will be described as follows. It is assumed that the upper mold 82 is constructed in such a way as it may be fixed to the horizontal plate 221 of the upper dome by the upper mold engaging or disengaging device 91 as shown in FIG. 23 and further the lower mold 81 is fixed to the lower platen 220 by the lower mold engaging or disengaging device 94 as shown in FIG. 25.

At first, the mold already fixed up to now is removed and then a new mold is fixed. Transportation of the new and old molds is carried out by the mold replacing boggie 25 shown in FIG. 25 and the engaging or disengaging of the new and old molds is carried out by the manipulator 2. With such an arrangement as above, a function to be attained by the manipulator 2 is a minimum function required for performing the engaging or disengaging operation and the mold replacing boggie 25 runs toward the tire vulcanizing press 1 in the case that the mold replacement is required.

At first, the manipulator runs toward the tire vulcanizing press 1 requiring the mold replacement, the holding plates 66 for the position setting means 34 shown in FIG. 3 are closed to become a position setting fixed state for holding the rectangular block 61. After this operation, the lifting-up or descending cylinder 30 is extended and the slide 31 descends, thereafter, the connector means 35 is operated to connect the slide 31 at the manipulator with the link 205 at the vulcanizing press. Then, the third driving device 36 in FIG. 21 is connected with the split-mold operating device 93, the rotary actuator 335 is rotated to cause the lifting-up or descending rod 93a to be rotated and then the connected state between the lifting-up or descending rod 93a and the upper mold is released. In addition, under a state in which the upper mold engaging or disengaging device 91 in FIG. 23 is connected to the first driving device 38, the first driving device 38 rotates the clamp rod 359 shown in FIG. 24 and the threaded engagement of the clamp rod 359 fastening the upper mold 82 is released. When the lifting-up or descending cylinder 30 is retracted under this state, both the I ink 205 and the upper dome 202 ascend and the upper mold is left while being mounted on the lower mold.

Figure 25:
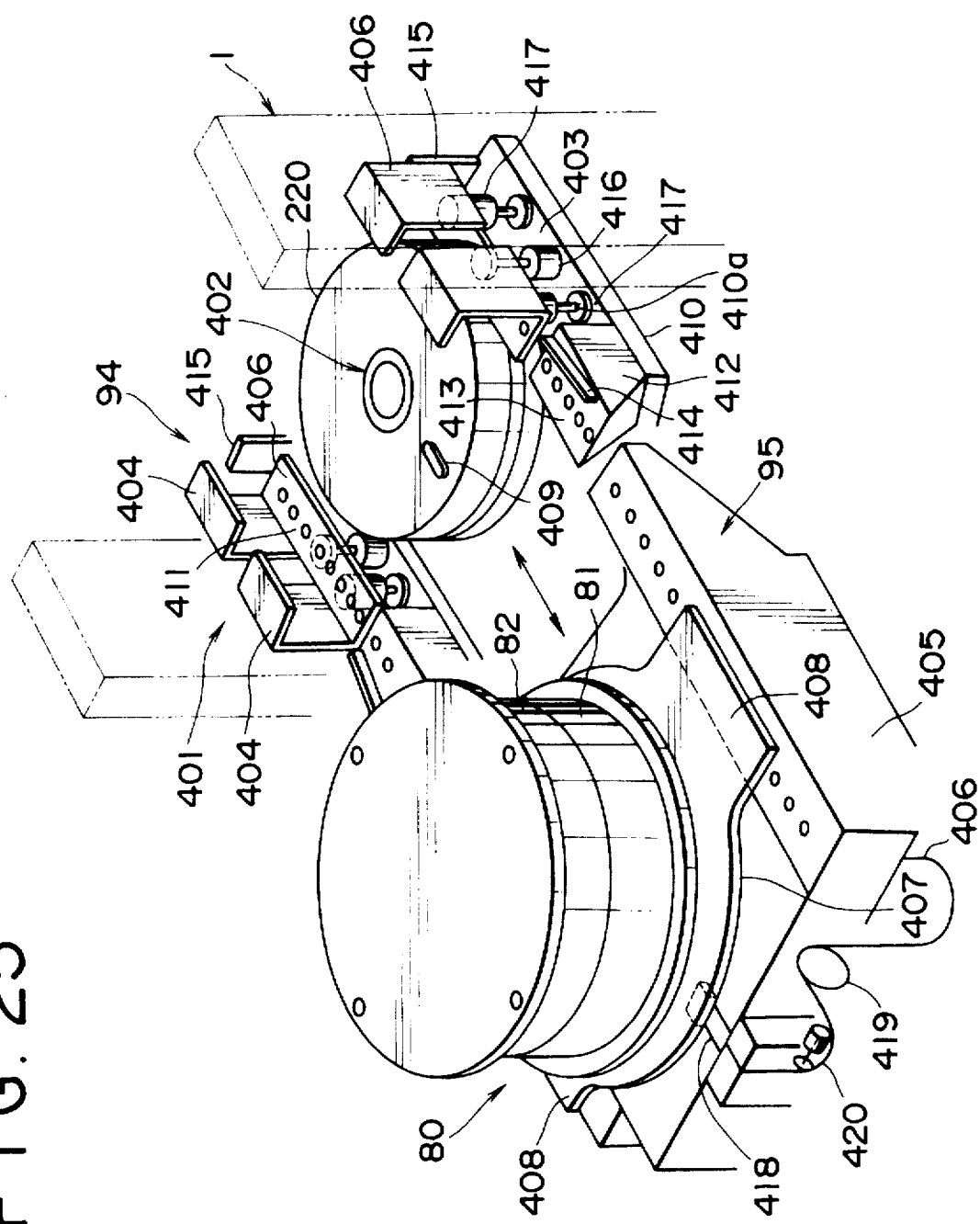
FIG. 25 is a perspective view for showing a schematic configuration of the lower mold engaging or disengaging device and the mold replacing boggie.

At this time, as shown in FIG. 25, the mold replacing boggie 25 runs before the tire vulcanizing press 1. Then, the lower mold engaging or disengaging device 94 ascends so as to release the fixed state of the mold plate 207 at the lower mold against the lower platen 220 and at the same time this device lifts up the upper and lower molds 80. Then, the mold plates 207 of the upper and lower molds 80 can slide out along the balls 411 and 413 on the guide members 407 and 412. Thus, the hook part 418 of the mold replacing boggie 25 is engaged with the mold plate 207, and the upper and lower molds 80 are mounted on the boggie 405 through feeding of the snake-chain 420. In addition, the mold replacing boggie 25 is provided with the two boggies 405, wherein the boggie 405 for mounting the old upper and lower molds 80 is automatically changed over to the boggie 405 for mounting the new upper and lower molds 80.

Then, the upper and lower molds 80 are sent out to the center of the tire vulcanizing press through the feeding-out of the snake-chain 420 in a reverse order opposite to that described above. Positions of the upper and lower molds 80 and the lower platen 220 are set by the position setting means 402, 409, and the lower mold 81 is fixed through the mold plate 207 by the lower mold engaging or disengaging device 94.

At this time, the mold height adjusting device 92 shown in FIG. 16 keeps the upper platen 223 pulled up to the upper limit position. Then, as the slide 31 shown in FIG. 3 descends, the upper and lower domes 202, 203 strike from each other and then the upper and lower domes 202, 203 are connected by the lock device 206. Then, as the mold height adjusting device 92 showing in FIG. 16 is operated to lower the upper platen 223, it strikes against the upper platen 223 and the upper mold 82. After this operation, the upper mold 82 is fixed to the horizontal plate 221 acting as the upper press member or the upper platen support 222 by the upper mold engaging or disengaging device 91. Then, the split-mold operating device 36 shown in FIG. 21 is operated so as to connect the lifting-up or descending rod 93a with the mold. Although the mold is replaced under the aforesaid procedure, operations of the mold height adjusting device 92, the upper mold engaging or disengaging device 91 and the mold operating device 36 are carried out by the driving device installed at the manipulator, so that it is not necessary to arrange the driving device at each of the tire vulcanizing presses. Although the manipulator 2 performs the vulcanizing cycle of each of the tire vulcanizing presses 1 and a mold replacement work. its controlling operation is carried out by the concentrated monitoring computer 9 as shown in FIG. 1. In view of this fact, an example of system configuration with the concentrated monitoring computer 9 will be described in reference to FIG. 29.

As shown in FIG. 1, it is assumed that three manipulators Nos. 1 to 3 perform the vulcanizing cycle in respect to the eighteen tire vulcanizing presses 1 of Nos. 1 to 18. Reference numeral 9 denotes the concentrated monitoring computer, reference numeral 10 denotes a manipulator control part and reference numeral 11 denotes a press control part. Although the manipulator control part 10 is arranged for each of the manipulators 2, the press control part 11 is arranged in common with that for the three tire vulcanizing presses 1. That is, the three tire vulcanizing presses 1 have the vulcanizing cycle of the same condition.

Figure 29:
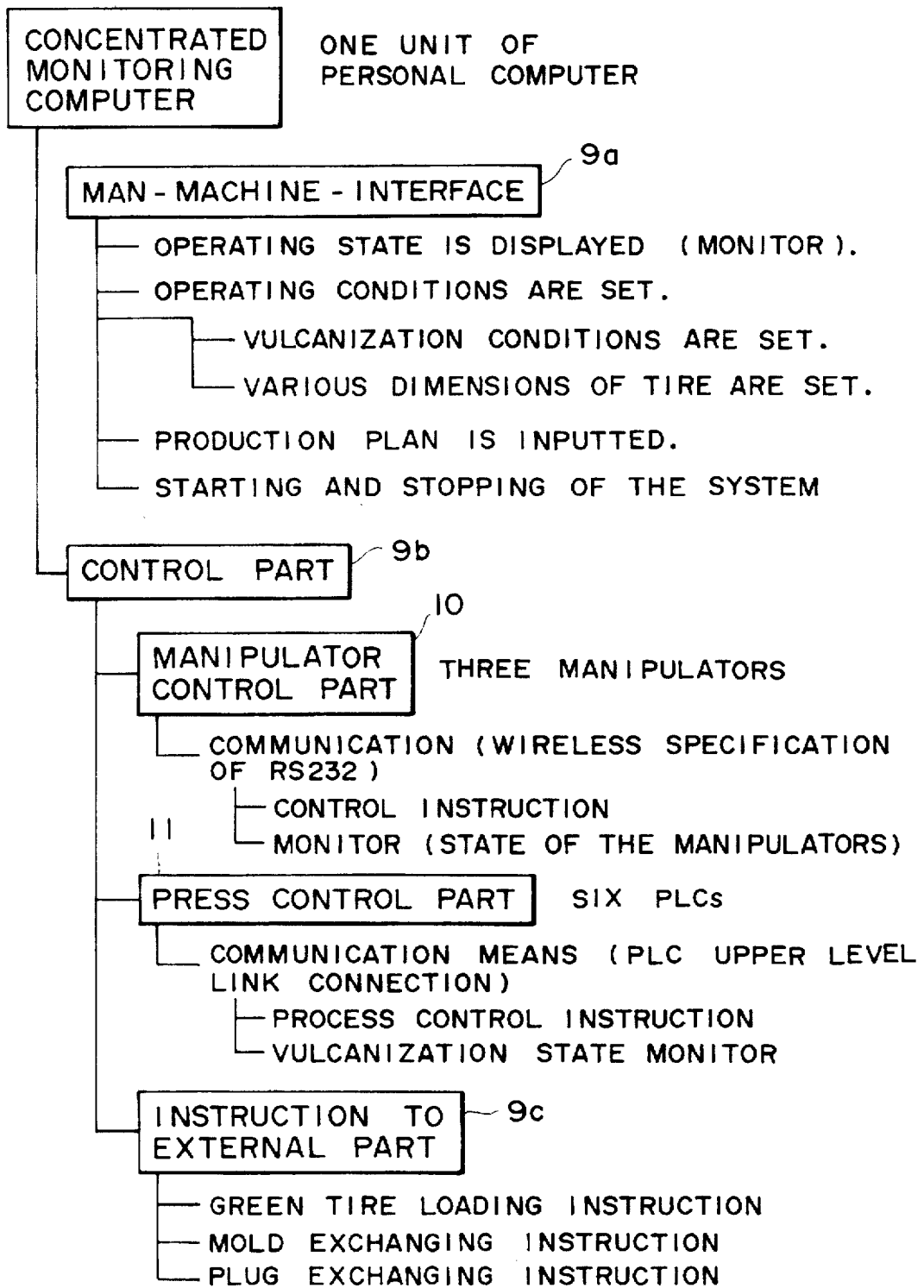
FIG. 29 is a system configuration of a concentrated monitoring computer.

In FIG. 29, the concentrated monitoring computer 9 is a personal computer which is comprised of a machine-interface 9a such as a key-board (a touch panel) or a monitor or the like and a control part 9b such as CPU or the like. To this control part 9b are connected a manipulator control part 10, a press control part 11 and an instruction part 9c for an external device. The machine-interface 9a displays an operating state of an entire system on the monitor, sets the operating conditions of the system, inputs a production plan and performs starting as well as stopping of the system through the key-board (a touch panel).

The manipulator control part 10 connected to the control part 96 outputs a control instruction through a communication means (a wireless specification of RS232) and further outputs a display of the state of the manipulator. The press controller 11 connected to the control part 96 outputs a process control instruction through a communication means (PLC upper level link connection) and performs an outputting for displaying the vulcanized state on the monitor. The instruction part 9c for the external part connected to the control part 96 operates systems related to the tire vulcanizing press such as those for an automatic transportation of a green tire, a mold replacement or a plug replacement and the like.

Figure 30:
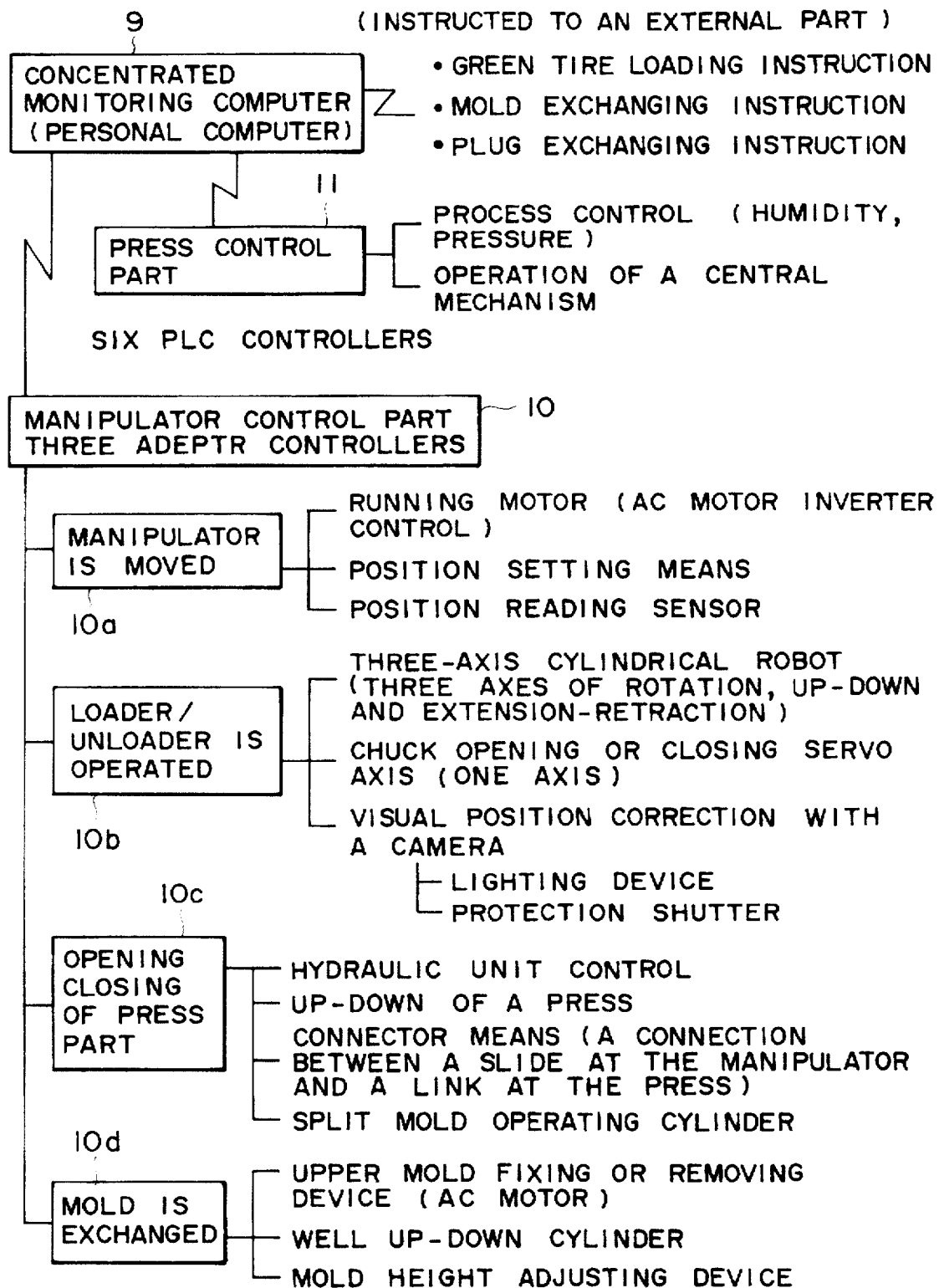
FIG. 30 is a view for showing operation items in the concentrated monitoring computer.

Referring now to FIG. 30, an example of operating items performed by the concentrated monitoring computer 9 having the aforesaid configuration will be described. The concentrated monitoring computer 9 itself outputs a green tire loading instruction, a mold replacement instruction or a plug exchanging instruction through an instruction part for the external device. Then, the manipulator control part 10 performs some items such as a manipulator movement 10a, a loader/unloader operation 10b, a press part opening or closing 10c and a mold exchanging 10a.

The manipulator movement 10a is connected to the running motor, the position setting means and the CCD camera acting as a position reading sensor, moves the manipulator up to the desired tire vulcanizing press running from a high speed to a low speed, sets its position at the predetermined position and fixes it.

The loader/unloader operation 10b is connected to three-axes (rotation, vertical movement, extension or retraction) type cylindrical robot for use in moving the loader/unloader which can be centered, a chuck opening or closing servo axis (one axis) coinciding with a tire size and a visual positional correction performed by the CCD camera, unloads the vulcanized tire by the unloader while performing a centering operation from the press center to the rim center of the post-cure inflator, and at the same time loads the green tire by the loader while centering from the green tire receiving table center to the press center.

The press opening or closing 10c is connected to a hydraulic unit control against the opening or closing cylinder, a press vertical movement performed through slide lifting-up or descending, a connector means and the split mold operating cylinder and the like and further performs opening or closing of the press coincided with the vulcanizing cycle.

The mold exchanging 10d is connected to an upper mold engaging or disengaging device for removing the upper mold, a vertical cylinder for retracting the well at the central mechanism and a mold height adjusting device coinciding with a new mold so as to enable the mold exchanging operation to be performed.

Referring now to FIG. 31, an example of an operating function performed by the manipulator control part will be described. The control function has an automatic operation mode and a manual operation mode. Under the automatic operation mode, movement of the manipulator 1, concurrent movement of two green tire loaders 2 (with a centering function performed with a visual positional correction), concurrent operation of two vulcanized tire unloaders 3 (with a centering function performed with a visual positional correction), opening or closing of the press 4, a split mold operation and an operation of the central mechanism 5 are performed automatically.

Under the manual operation mode, an exchanging operation of the mold 6, an exchanging operation of the plug 7, a positional calibration of the visual correction camera 8, inputting initial position parameters of robot and camera constituting the loader/unloader 9, teaching of the loader/unloader robot 10, a single operation of each of the actuators 11, the hydraulic unit control 12, an emergency control 13 and interlocking are selectively performed under an assistance of an operator.

As a communication function for the manipulator control, there is a communication with the concentrated computer. As the monitor displaying and the operating function, there are a displaying of state with a liquid crystal panel 15 such as abnormal displaying or the like and a manual operation performed through a touch panel 16.

Figure 32:
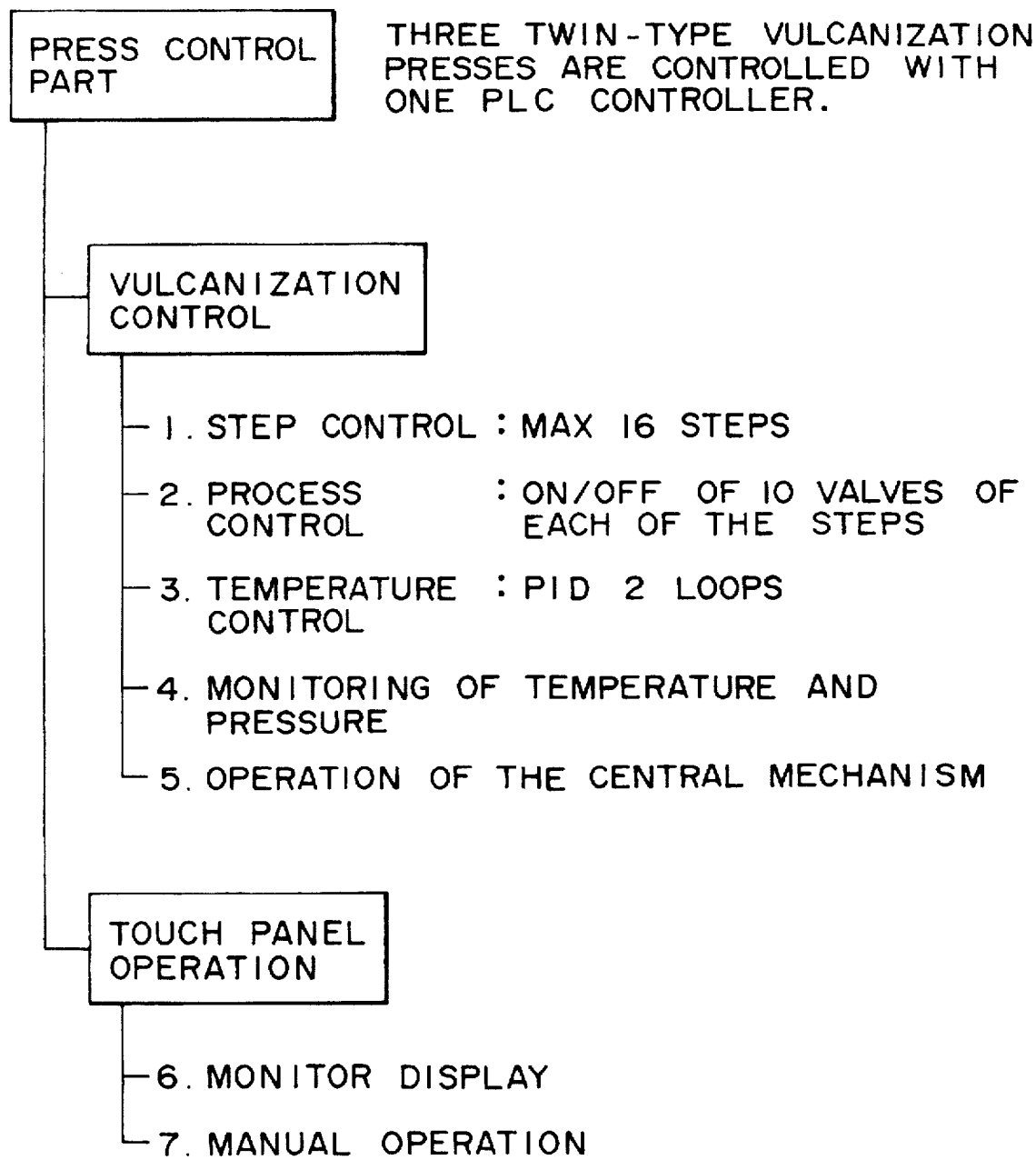
FIG. 32 is a view for showing operation items in the press control part.

Further, referring now to FIG. 32, an example of operating function performed by the press control part will be described. As the vulcanizing functions, there are provided a step monitoring 1, a process monitoring 2, a temperature control 3, a temperature and pressure monitoring 4, and an operation of a central mechanism. In addition, as the touch panel operating function, there are a monitor displaying 6 and a sliding operation 7.

With such an arrangement as above, it becomes possible to perform rapidly a control which can accommodate for a changing of tire type and the like.

Then, referring to FIG. 33, the preferred embodiment of another tire vulcanizing press performed by a preferable manipulator will be described. Although it is necessary to have a centering function performed by the loader/unloader in order to manufacture the tire having a superior balance accuracy, a degree of the centering is depend upon an accuracy of running and stopping of the manipulator. In order to perform this operation, it is necessary to install the rails on which the manipulator runs under an accuracy as superior as possible. However, according to the normal installing work in which the tire vulcanizing presses and the rails are installed independently on the floor, there is a certain limitation in accuracy in installing the rails.

Then, the system in which the rails and the position setting means are mounted on the press base to improve a stopping accuracy of the manipulator corresponds to one shown in FIG. 33. A part differing from that illustrated in FIG. 4 will be described. The press base 204 is added with and provided with an extending part 204a, wherein the mountain-shaped rail 3 and the flat rail 4 are installed on the extending part 204a, and in addition, the position setting means 34 is also arranged at the extending part 204a.

With such an arrangement as above, the fixing position of the position setting means 34 can be accurately machined at a mechanical plant and a positional relation between the position setting means 34 and the tire vulcanizing press 1 can be uniformly determined. When the machine is assembled at site, it is satisfactory to have a mere realization of the positional relation. In addition, since the rails 3 and 4 are also arranged at the extending part 204a of the press base 204, a troublesome installing adjustment is not required when the rails 3 and 4 are installed, resulting in that the positional relation with the tire vulcanizing press 1 becomes accurate. As a result, a stopping accuracy of the manipulator 2 can be improved, the centering adjustment with the loader/unloader can be carried out within a short period of time, and a smooth connection between the split-mold operating device and the driving device can be carried out.

Lastly, referring now to FIG. 34, a still further preferred embodiment of the tire vulcanizing press with the preferable manipulator will be described. As the manipulator 2 runs to cover the tire vulcanizing press 1 as shown in FIG. 3, it is necessary to keep a space for the manipulator 2 to run on the floor surface. However, it is necessary to arrange on the floor surface a green tire mounting table installing space, a post-cure inflator mounting space and a running space for the mold exchanging boggie and the like, and further when the manipulator 2 runs on the floor surface, an area of the entire tire vulcanizing system is widened.

Figure 34:
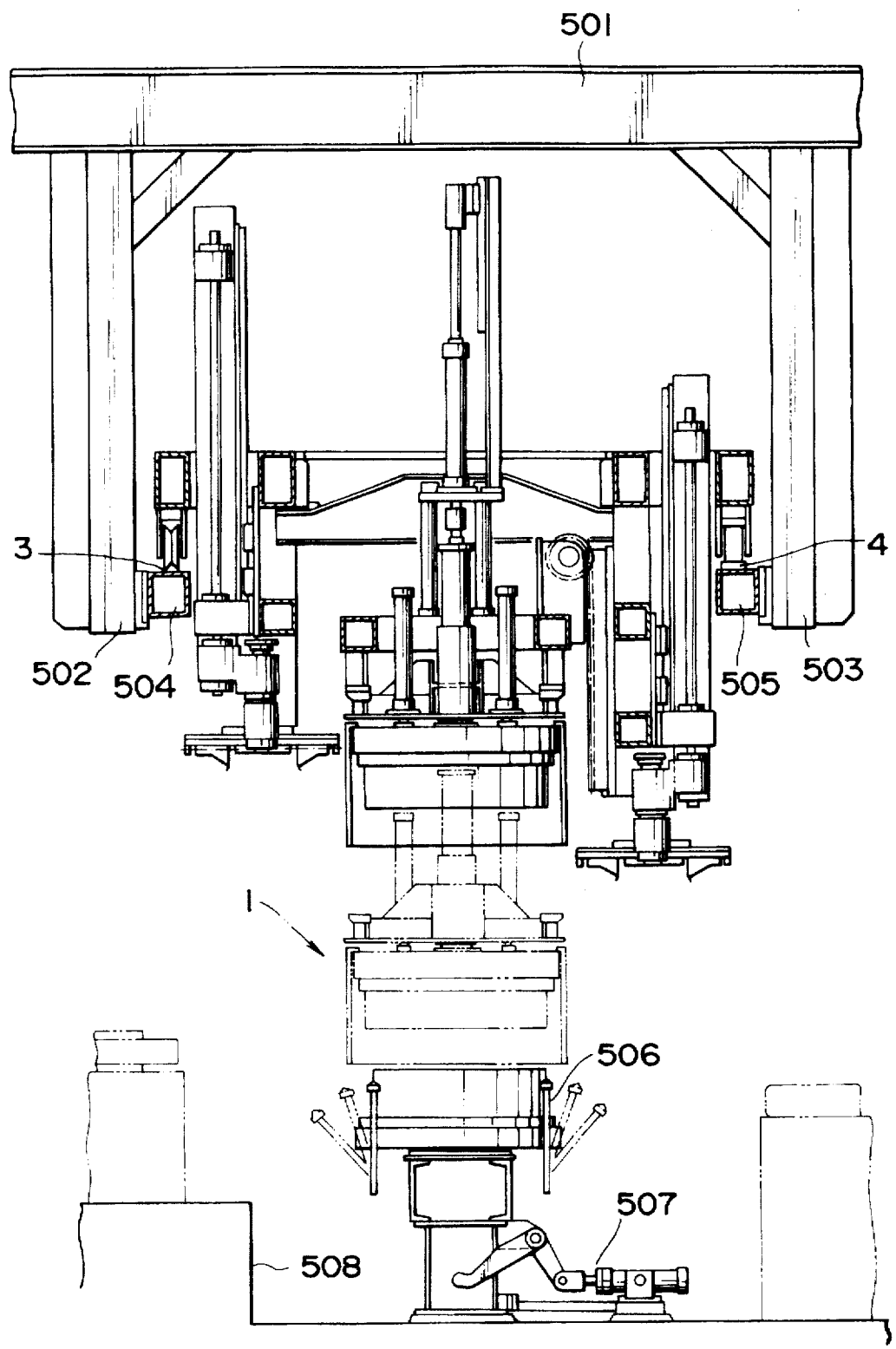
FIG. 34 is a side elevational view for showing a still further tire vulcanizing system.

In view of the above, a system in which the manipulator runs on a ceiling so as to enable the floor surface to be widely used is one shown in FIG. 34. A part differing from that shown in FIG. 3 will be described. Supporting columns 502, 503 are vertically suspended from the ceiling beam 501 with a predetermined space, wherein the lateral beams 504, 505 are fixed to the supporting columns 502, 503 through bolt fastenings or the like. Then, the mountain-shaped rails 3 are installed on one lateral beam 504 and the flat rails 4 are installed on the other lateral beam 505.

As shown in the figure, the major portion of the manipulator 2 runs on the tire vulcanizing press 1 and a surplus space is produced around the tire vulcanizing press 1. Due to this fact, it becomes possible that the hydraulic cylinder is not used as the press fastening means, but a mechanical fastening means of bolts 505 which can be swung and retracted may be employed. In addition, it becomes also possible that the hydraulic cylinder 507 for use in operating the central mechanism is placed in a lateral orientation as shown in the figure and a depth of the troublesome pit 508 can be made shallow during a civil engineering work.

What is claimed is:

1. A tire vulcanizing system comprising:
    a group of tire vulcanizing presses comprising at least one row of said presses, each of said presses comprising an upper press member, a lower press member, and upper and lower molds which can be fastened to one another;

a plurality of green tire mounting tables;

a plurality of post-cure inflators; and a plurality of manipulators movable in proximity to said presses for transferring green tires from said green tire mounting tables to said presses and for transferring vulcanized tires to said post-cure inflators, wherein each of said manipulators comprises:

a) a slide connectable to said upper press members, b) a loader for transferring green tires from said green tire mounting tables to said presses, c) an unloader for transferring vulcanized tires to said post-cure inflators, d) means for setting a position of said manipulator with sufficient accuracy to permit said slide to connect to one of said upper press members, and e) centering correction means on at least one of said loader and said unloader for correctly centering said green tire in the mold of the press having said one of said upper press members.

2. The tire vulcanizing system of claim 1 wherein said centering correction means comprises a visual sensor.

3. The tire vulcanizing system of claim 2 wherein said visual sensor is able to sense centers of more than one of said green tire mounting table, said mold and said post-cure inflator.

* * * * *